United States Patent [19]
Sirkar et al.

[11] Patent Number: 5,868,935
[45] Date of Patent: Feb. 9, 1999

[54] METHOD AND APPARATUS FOR EXTRACTION AND RECOVERY OF IONS FROM SOLUTIONS

[75] Inventors: Kamalesh K. Sirkar, Berkeley Heights; Zhifa Yang, Kearny; Asim Kumar Guha, Edison, all of N.J.

[73] Assignee: New Jersey Institute of Technology, Newark, N.J.

[21] Appl. No.: 405,257

[22] Filed: Mar. 15, 1995

[51] Int. Cl.[6] ................................................. B01D 17/00
[52] U.S. Cl. .................... 210/643; 210/638; 210/639; 210/90; 210/321.8; 210/644
[58] Field of Search ................................ 210/638, 511, 210/137, 90, 321.64, 321.65, 641, 644, 321.75, 321.8, 637, 639

[56] References Cited

U.S. PATENT DOCUMENTS

| | | | |
|---|---|---|---|
| 3,342,729 | 9/1967 | Strand | 210/638 |
| 4,789,468 | 12/1988 | Sirkar | 210/137 |
| 4,997,569 | 3/1991 | Sirkar | |
| 5,114,579 | 5/1992 | Takigawa | 210/643 |

OTHER PUBLICATIONS

Guha et al., (1994) AIChE J. 40:1223–37.
Guha et al. A(1994) 20th Ann. EPA RREL Res. Symp.
Yun et al. (1993) Ind. Eng. Chem. Res. 32:1186–95.
Majumdar et al. (1989) J. Membrane Sci. 43:259–76.
Majumdar et al. (1988) AIChE J. 34:1135–45.
Sengupta et al. (1988) AIChE J. 34:1698–1708.
Danesi et al. (1987) J. Membrane Sci. 31:117–45.

*Primary Examiner*—Ana Fortuna
*Attorney, Agent, or Firm*—Klauber & Jackson

[57] ABSTRACT

A novel hollow fiber membrane-based synergistic extraction technique has been developed for removal and recovery of individual heavy metals from aqueous streams. This technique has a number of advantages over conventional solvent extraction, emulsion liquid membrane, and supported liquid membrane methods. It may be easily scaled up to meet the requirements for pollution control of heavy metals in industrial processes and selective separation hydrometallurgy.

19 Claims, 14 Drawing Sheets

FIG. 2
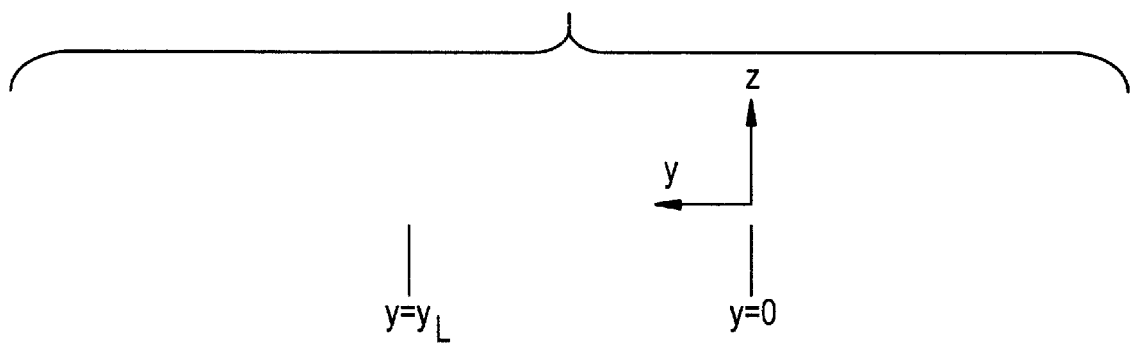
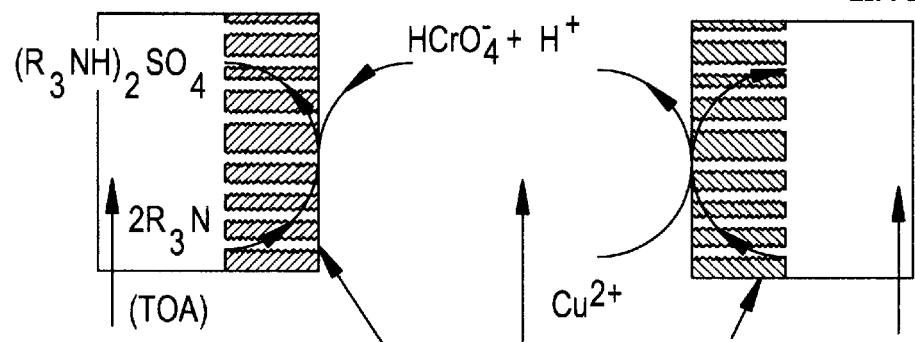
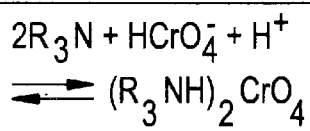
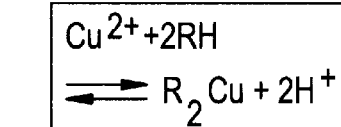

- 20% v/v LIX 84- heptane only; Flow rate : 1.15 ml/min.
- ○ □ 20% v/v TOA- heptane; Flow rate : 1.38 ml/min. 20% v/v LIX 84- heptane; Flow rate : 1.15 ml/min.

1 & 3: 20% v/v LIX 84- heptane only
Flow rate: 0.5 ml/min.
2 & 4: 20% v/v TOA- heptane and
20% v/v LIX 84- heptane;
Flow rate: 0.5 ml/min.

- Only 20% v/v LIX 84- heptane:
  Flow rate : 1.15 ml/min.
- ○ 20% v/v TOA- heptane;
  Flow rate : 1.38 ml/min.
  20% v/v LIX 84- heptane;
  Flow rate : 1.15 ml/min.

- Only 20% v/v LIX 84- heptane;
  Flow rate : 0.5 ml/min.
- ○ 20% v/v TOA- heptane and
  20% v/v LIX 84- heptane;
  Flow rate : 0.5 ml/min.

- 10% v/v LIX 84- heptane and 20% v/v TOA- heptane
- 20% v/v LIX 84- heptane and 20% v/v TOA- heptane
- 30% v/v LIX 84- heptane and 20% v/v TOA- heptane

- 20% v/v LIX 84- heptane and 20% v/v TOA- heptane
- 30% v/v LIX 84- heptane and 30% v/v TOA- heptane

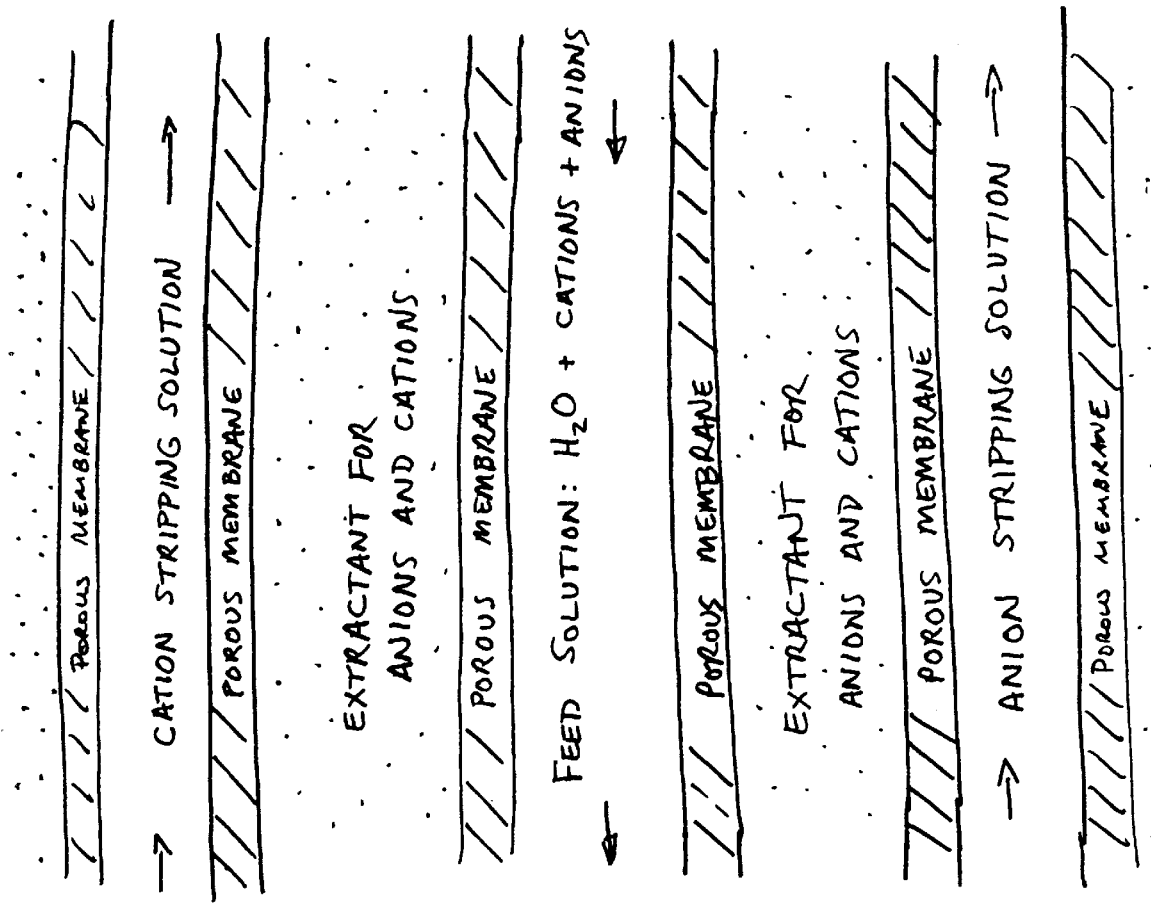

METHOD AND APPARATUS FOR EXTRACTION AND RECOVERY OF IONS FROM SOLUTIONS

FIELD OF THE INVENTION

The present invention relates to extraction of ions from liquids, particularly aqueous streams. This technology is useful for pollution control and abatement, as well as for resource recovery. The present invention is aimed at the use of a novel hollow fiber membrane-based synergistic extraction technique for individual heavy metal removal and recovery from aqueous streams in various industrial and hydrometallurgical processes. The novel process has a number of advantages over conventional dispersive solvent extraction, the emulsion liquid membrane (ELM) extraction or the supported liquid membrane (SLM) extraction techniques.

BACKGROUND OF THE INVENTION

Efficient removal and recovery of toxic heavy metals from industrial waste streams prior to discharge is a major challenge. Not only does it eliminate acute toxicity of the waste, but also it prevents metal accumulation in biological sludge, which can have severe long term environmental consequences.

Solvent extraction has been a useful operation in separation processes, especially in hydrometallurgical processes. It may be used to remove efficiently toxic heavy metals, e.g., Zn, Cu, Cr, Ni, Cd, and Hg from an effluent to environmentally acceptable levels and recycle these metals to the original processes. In this operation, a liquid solvent S is used to extract a solute (or solutes) M from a second liquid F in which M is dissolved. Solvent liquids S and F are immiscible or substantially immiscible. In conventional operation, solvent liquids S and F are mixed directly, then separated into two phases.

There are some disadvantages inherent in this operation, however. For example, during the direct mixing, an emulsion will be formed that will not only reduce the mass transfer efficiency but result in loss of the extraction solvent S and lower solute M recovery. Conventional solvent extraction also consumes more energy and capital. This technology provides little flexibility with respect to changes in flow rates.

A nondispersive solvent extraction technique has been developed by Sirkar (Sirkar, U.S. Pat. No. 4,789,468 (1988)). Sirkar, U.S. Pat. No. 4,997,569 (1991), describes phase interfaces immobilized at the pore mouths of porous/microporous flat membranes or hollow fiber membranes. For example, an aqueous liquid F flows through the bore or the shell-side of a hollow fiber module. The hollow fibers are microporous or porous, and are usually hydrophobic, in which case the aqueous feed does not wet the pores of hydrophobic fibers. An organic extractant S flows on the other side (shell side or the fiber bore) of the hollow fiber module and wets the fiber pores. If the aqueous solution pressure is equal to or slightly greater than that of the organic extractant phase, the aqueous-organic interface is immobilized on the aqueous side of the membrane and solvent extraction is achieved through this immobilized interface. As long as the aqueous phase pressure does not exceed the organic phase pressure by an amount called the breakthrough pressure (Prasad and Sirkar, Chapter 41 in Membrane Handbook (Ho and Sirkar, Editors), Van Nostrand Reinhold (1992)), the phase interface is immobilized at the pore mouths and nondispersive solvent extraction can be carried out.

To recover the metal extracted into the organic phase, one usually contacts the organic phase with a back-extracting aqueous solution. A thin layer of organic solvent may be used as a membrane to achieve extraction on one surface of the membrane and back extraction at the other surface of the membrane. Organic liquids S immobilized in inert microporous supports can, for example, be used to transfer a solute M between two aqueous solutions F1 and F2. This kind of operation is usually called supported liquid membrane (SLM) separation. The main disadvantage of SLM-s is the lack of long term stability, which probably results from loss of membrane solvent S by solubility, osmotic flow of water across the membrane, progressive wetting of the support pores, and pressure differential across the membrane (Danesi et al., J. Memb. Sci., 31 (2–3), 117 (1987)).

A novel but robust liquid membrane structure using hydrophilic or hydrophobic microporous hollow fibers called Hollow Fiber Contained Liquid Membrane (HFCLM) was proposed recently by Sirkar's group (Majumdar et al., AIChE J., 34, 1135 (1988); J. Memb. Sci., 43, 259 (1989); Sengupta et al., AIChE J., 34, 1698 (1988); Guha et al., AIChE J. 40; 1223 (1994)). This HFCLM retains the inherent SLM advantages and overcomes most of its shortcomings. The aqueous-organic interfaces are immobilized in the pores of two sets of commingled highly open microporous polymeric membranes. In this arrangement, the two aqueous phases flow through the porous membrane fiber bore in contact with the liquid membrane present in the shell side between the fiber sets. The membrane pores are filled with the organic phase, preferentially wetting it, while the immiscible aqueous phase is completely excluded. Extraction is easily achieved by transfer of solutes through the aqueous-organic interfaces immobilized at the pore mouths of one set of fibers for feed solution by maintaining a pressure difference between the aqueous feed phase and the stationary liquid membrane phase. Back extraction is achieved similarly at the immobilized organic-aqueous interfaces in the pores of second set of fibers through the bores of which the aqueous "strip" (or back-extraction) solution flows. The basic concept and apparatus are described in two patents by Sirkar (Sirkar, U.S. Pat. No. 4,789,468 (1988); Sirkar, U.S. Pat. No. 4,997,569 (1991)).

The citation of any reference herein should not be deemed an admission that such reference is available as prior art to the invention.

SUMMARY OF THE INVENTION

The present invention provides an immobilized-interface ion solute-transfer unit for transferring an ion solute, such as a metal ion, from an aqueous feed solution to an extractant solvent. Preferably, the invention provides for simultaneous specific extraction of multiple metal ions into separate extraction solvents. According to the invention, synergistic extraction processes are provided. In one embodiment, changes in pH that can result from extraction of a metal ion into an extractant solvent, for example a decrease in pH associated with extraction of a cation into an extraction solvent having an exchangeable proton, are offset by extraction of a different metal ion, having an opposite charge, into a different extraction solvent. In another embodiment, pH changes resulting from extraction of an ion, e.g., extraction of a cation as mentioned above, are offset by extraction of a proton into a different extraction solvent (or donation of a proton by the different extraction solvent, if that is called for). In an additional embodiment, specific extraction of ions having the same charge is facilitated by simultaneously extracting each ion by means of separate ion-specific extraction solvents to decrease co-extraction. Preferably, an ionic solute or solutes are removed or stripped from the separate extractant solvents into separate, specific aqueous strip phases, thereby regenerating the extractant solvents and isolating each solute.

The solute transfer unit is comprised of a fluid-tight housing. Located in and connected to the housing are at least two sets of porous membranes. Each porous membrane, which is preferentially wettable by one of the feed solution and extractant solvent, and more preferably wettable by the extractant solvent, divides the housing into a feed solution chamber, and at least more than one extractant chamber, or a feed solution chamber, and extractant chamber, and at least one stripping solution chamber. The housing has a feed solution inlet port and a feed solution outlet port which communicate with the feed solution chamber. A pressure difference control means maintains a difference between a liquid pressure of a feed solution in the feed solution chamber and a liquid pressure of an extractant in the extractant chamber, so that an interface between the feed solution and the extractant is substantially immobilized at the pores of the porous membrane to effectively prevent the formation of a dispersion of feed solution and extractant in either chamber on opposing sides of the membranes.

In a particular embodiment, the immobilized-interface metal ion solute-transfer unit is a hollow fiber contained liquid membrane system. In the hollow fiber contained liquid membrane (HFCLM) system, more than one set of hollow fibers are packed in a shell-and-tube type heat exchanger arrangement. In one such embodiment, termed a "three fiber set" embodiment, at least three fiber sets are present in the housing. A feed solution passes through one fiber set, corresponding to a feed solution member. Two separate stripping solutions pass through the other two fiber sets, corresponding to a first and second ion stripping members, respectively. An extractant solvent is present in the housing in contact with the feed solution member and the ion stripping members, which extracts ions from the feed solution.

In an alternative embodiment, also termed herein a "two fiber set" embodiment, the feed solution is infused or pumped into the housing, which also contains at least two sets of fibers. Each set of fibers corresponds to an extractant member. Each extractant member can be independently provided either as an HFCLM, system, in which extractant solvent is pumped or infused through the bore of the hollow fiber. Alternatively, each extractant member can be independently provided as a supported liquid membrane (SLM) system, in which the extractant solvent is provided in the pores of the microporous or porous membrane, and a stripping solution flows through the bore of the hollow fiber.

Preferably, the liquid extractant is a highly ion selective organic liquid membrane in which water has very low solubility. However, the invention provides for stripping, or back extracting, ionic species from an organic solvent into an aqueous solution. In a particular aspect of the invention, the ion is extracted into an organic supported liquid membrane from a feed solution, and then stripped, or back extracted, into an aqueous stripping solution, e.g., flowing through the bore of a microporous hollow fiber.

In a further embodiment, the invention contemplates contacting a feed solution with an extractant solvent through a microporous or porous membrane, with extraction of both ions and volatile organic compounds (VOCs), into the organic extractant solvent. The ions extracted into the organic extractant solvent can be stripped, or back extracted, using one or more stripping solutions in a microporous membrane system, e.g., an HFCLM system. The VOCs can be stripped from the organic extractant as well. In this embodiment of the invention, located in and connected to the housing, is a vacuum member fabricated from a nonporous material that is permeable to the vaporizable solute. The nonporous material contacts the extractant solvent. The housing has a vacuum outlet port which communicates with the vacuum chamber. Thus, as described in greater detail in U.S. application Ser. No. 08/305,873, filed Sep. 14, 1994 by Sirkar et al., entitled "HOLLOW FIBER CONTAINED LIQUID MEMBRANE PERVAPORATION FOR REMOVAL OF VOLATILE ORGANIC COMPOUNDS FROM AQUEOUS SOLUTIONS," which is hereby incorporated by reference in its entirety, the present invention provides a liquid membrane based apparatus for separating volatile organic compounds from aqueous solutions into an extractant liquid and drawing the volatile organic compounds into a vacuum, where the compounds can be collected in condensed form, in addition to separating ions from an aqueous solution.

In specific Examples, infra, the present invention describes uses of hollow fiber membrane devices having two-fiber sets and three-fiber sets, which can specifically remove ions, e.g., metal ions, from aqueous industrial streams, which has superior performance and cost benefits compared to standard solvent extraction methods, and which has substantial practical importance in pollution control and separation technology.

The present invention advantageously provides for high stage separation factors for each metal ion. Extractant loss (and corresponding contamination of the waste water) is negligible, extraction and stripping can proceed simultaneously in the same module, synergistic extraction can be achieved, and the modules are highly flexible with respect to how they are arranged. Additionally, the improvement provides greater efficiency, making its use in the field of waste management desirable. For example, because there are fewer moving parts, capitalization and maintenance costs are lower.

Thus, a primary object of the invention is to provide an apparatus which separates metal ions from aqueous waste streams.

It is a particular object of this invention to provide a simple, efficient and economic solvent extraction process for the extraction and separation of toxic metals from a first solvent liquid to a second, third and/or fourth solvent liquid by use of microporous/porous hollow fiber membranes (HFM) which have a large mass transfer area per unit volume and without directly intermixing the immiscible liquids.

Another object of the invention is to provide an apparatus in which stable liquid membrane-based processes may be performed for metal ion separations using liquid membranes with higher selectivity for specific metal ions and lower water flux.

Another object of the invention is to provide an apparatus in which stable liquid membrane-based processes may be performed to simultaneously separate and concentrate metal ions from aqueous solutions.

It is another and more specific object to provide hollow fiber membrane-based synergistic solvent extraction technologies to specifically remove heavy metals present in a mixed waste stream and concentrate them for recycling and reuse.

These and other objects will be apparent to those of ordinary skill from the teachings herein.

BRIEF DESCRIPTION OF THE DRAWINGS

FIG. 2. Schematic of the synergistic extraction of $Cu^{2+}$ and $Cr^{6+}$ in a module containing two sets of hollow fibers.

FIG. 19. Schematic arrangement of synergistic membrane-based extractor apparatus for the removal and separation of anions and cations from an aqueous feed solution.

DETAILED DESCRIPTION OF THE INVENTION

Figure 1A:
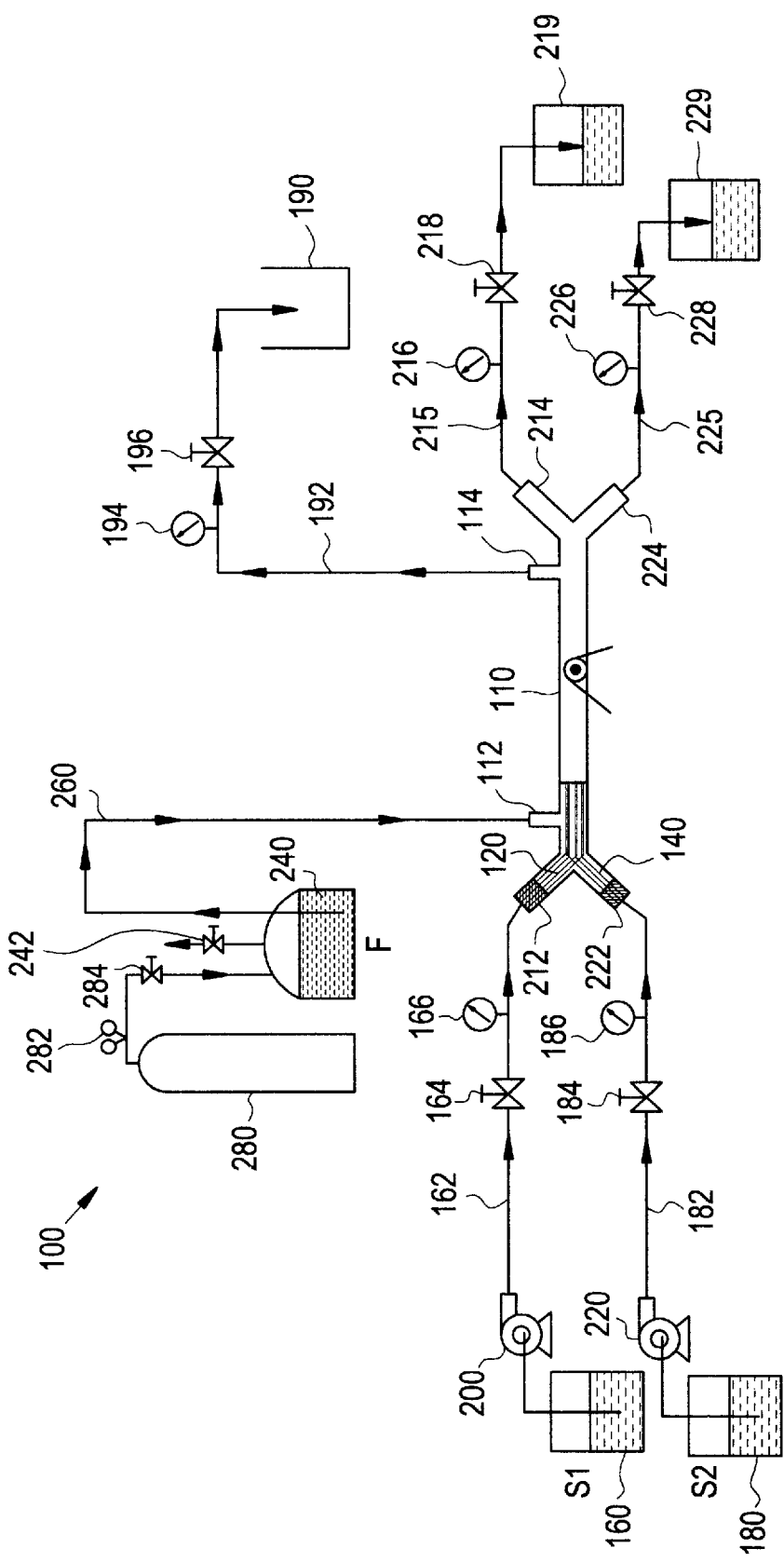
FIG. 1. A) Schematic arrangement of synergistic membrane-based extractor apparatus for the removal and separation of heavy metals from waste water. B) Exploded view of the two set of hollow fibers closely packed in the module shell. C) Schematic view of the walls of a hollow fiber showing the lumen or bore containing the solvent separated by the microporous wall from the aqueous phase containing heavy metals as cations and anions, and the immobilized aqueous-organic interface in the pore.

Heavy metals are generally present in waste water as cations or as anions. Cations are usually extracted into an organic diluent by acidic or chelating extractants. Anionic metal species in an aqueous solution can be extracted into an organic diluent via ion-pair formation with long chain alkyl amines in the presence of salts or acids in the aqueous phase (Ritcey and Ashbrook, Solvent Extraction, Part I, Elsevier, Amsterdam, 1984).

Specific extraction and separation of the metals having similar properties is an important challenge in hydrometallurgical industry and pollution control. Many organic extractants having specific selectivity for some metals have been synthesized and widely used. However, a large number of extraction stages are required to separate this mixture of metals due to the coextraction of the other metals since the selectivity of the extractants is limited. In the present invention, a hollow fiber membrane-based technique is developed to enhance the selectivity of the extractants and to extract and separate these kinds of metals simultaneously. The extraction and separation of zinc(II) and copper(II) is used to illustrate this technique.

Selective extraction of one metal over another having the same ionic form in aqueous waste by a given organic extractant is highly pH dependent. The present invention advantageously provides for extraction of individual cationic metal species into different streams of acidic extractants thus releasing a proton in the aqueous phase while the anionic species are extracted into different streams of basic amine-containing extractants, which consumes the proton released by extraction of the cationic metal into the acidic stream. The pH in such a solvent extraction device is kept within a small range, stabilizing the reaction conditions and allowing selection of one metal in preference to another into each of the extractants according to the preference for specific extraction under the starting reaction conditions.

After specific extraction into the extractant solvent or solvents, each of the individual metal species can be back extracted from the particular organic stream into a concentrated aqueous solution for recovery and reuse. This technique is illustrated herein in specific Examples, which show the extraction of copper(II) and chromium(VI) with LIX 84 (anti-2-hydroxy-5-nonylacetophenone oxime) in diluent and trioctyl amine (TOA) in diluent, respectively, according to the reactions below:

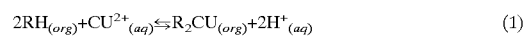

Here RH stands for LIX 84. By this extraction of copper into the organic phase, protons are released into the aqueous phase, leading to a decrease of the aqueous pH, and consequently a decrease in the extraction efficiency of copper(II) by LIX 84 in diluent. However, by simultaneously extracting chromium(VI) (as $HCrO_4^-$) via the reaction

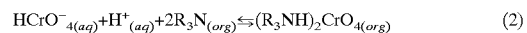

where $R_3N$ stand for TOA, the protons released by reaction (1) are consumed for chromium (VI) extraction. Thus, the pH of the aqueous feed stream remains substantially constant, which preserves the efficiency of copper(II) extraction.

A fluid tight housing of the invention can have any geometric shape, e.g., cylindrical, cubic (square or rectangle), etc. The porous membranes can adopt any orientation within the fluid tight housing, provided they define separate fluid tight areas of the apparatus. For example, the fluid tight housing may have a flat rectangular shape. Within the housing, porous membranes are oriented as sheets co-planar with the plane of the housing having the greatest surface area to create a cell in the interior of the housing for a feed solution, and one or more of an extractant members or an extractant member and one or more stripping members. In this "flat sheet" embodiment, the maximum possible surface area for the membranes provides for maximum efficiency of transfer of metal solute from the feed solution to the extractant or extractants, and, in a further embodiment, from the extractant to a stripping solution.

In a preferred aspect, the solute transfer unit of the invention is a "Hollow Fiber Contained Liquid Membrane System". The term "Hollow Fiber Contained Liquid Membrane System" or equivalent, "HFCLM System", refers to a system in which multiple sets of hollow microporous fibers are present, and separations from a feed solution into one or more extraction solvents, and in a preferred embodiment, thence into corresponding stripping solutions occurs. In this type of system, the highly selective organic liquid membrane is contained in the shell side between two sets of hollow fibers packed in a shell-and-tube heat exchanger type arrangement. The process of invention may be conducted at a temperature of from about 1° to about 75° C.

The extraction processes of the invention advantageously work synergistically. As used herein, the term "synergistic" in all its grammatical forms refers to the ability of different extractant solvents used in a single system to facilitate specific extraction of ions by the other extraction solvents. For example, use of an extractant solvent specific for a cation in conjunction with an extraction solvent specific for an anion synergistically provides for maintenance of system pH and charge balance. According to the invention, the extractants can be maintained separately or mixed together, depending on whether the two-fiber set or three-fiber set configuration is employed. Use of an extractant specific for one type of cation (or in an alternative embodiment, a first anion) and a different extractant specific for another type of cation (or, in the alternative embodiment, a second anion) synergistically facilitates specific extraction and greatly limits cross-contamination. These advantages of the present invention are not found in the prior art extraction systems.

In a further embodiment of the three fiber set embodiment of the invention, the housing also contains a nonporous material, which is formed as a vacuum atmosphere member. The nonporous material contacts the extractant solvent and is permeable to volatile organic compounds. Vaporizable organic compounds that partition into the extraction solvent will be drawn through the nonporous material (which is permeable to the VOCs) into the vacuum. The VOCs can be condensed and recovered using an appropriate trap, e.g., a low temperature (such as liquid nitrogen) trap.

As used herein, the term "ion" refers to an anion (net negatively charged molecule) or cation (net positively charged molecule). In the specific examples, infra, the ions are metal ions. However, the method and the apparatus of the present invention can be readily adapted for the specific extraction of any ionic species, including but not limited to peptides, proteins, carbohydrates, nucleic acids, fatty acids, ionic detergents, organic molecules having molecular weights of between 50 and 1000 (including without limitation amino acids, sugars or sugar derivatives, and nucleotides), organometallics, inorganic molecules, and the like. According to the invention, many possible combinations of extractant solvents in which the ion is soluble can be prepared for extraction of the specific ionic species, i.e., an anion or a cation.

As used herein, the term "metal ion" refers to a metal, generally a heavy metal, present in an aqueous waste stream, e.g., from a manufacturing or mining operation, from a toxic waste site, or from organic waste and landfill effluent. Examples of cationic metals include, but are not limited to, copper(II), zinc(II), iron(II), nickel(II), cobalt(II), magnesium(II), aluminum(III), alkali earth metals (lithium (I), sodium(I), potassium(I), and cesium(I)), lanthanide series elements such as europium(III), actinide series elements such as uranium and americium(III); examples of anionic metals include chromium(VI), tungsten(VI), molybdenum(VI), and mercury(II).

As used herein, the term "vaporizable solute" refers to solutes such as volatile organic compounds. The term volatile organic compounds, or equivalent, "VOC", is used herein to denote any organic compound having a boiling point of up to 150° to 160°. Specific examples of VOCs include: trichloroethylene, toluene, xylene, acetone, trichloromethane, methanol, ethanol, methyl ethyl ketone, carbon tetrachloride, isobutanol, chlorobenzene, pentane, hexane, octane, fluorinated hydrocarbons (CFC-11, CFC-12, CFC-113, CFC-114, CFC-115, etc.), HCFC ($C_2HCl_2F_3$), perchloroethylene, propanol, butanol, acetic acid, propionic acid, butyric acid, lactic acid, alkanes, aromatics, cyclic compounds (including alkyl), ethers, ketones, aldehydes, amines, etc., to mention but a few. Those skilled in the art will recognize the above list of examples is not exhaustive.

The term "aqueous" refers to a polar liquid solution containing water and other polar compounds. In the present invention, an aqueous solution contains one or more ions, and may contain volatile organic compounds. The source of the aqueous solution containing ionic species, and possibly VOCs, may be, for example, waste water, streams used in industrial processing, fermentation broths, etc.

The term "porous membrane" or "microporous membrane" refers to a hydrophobic, hydrophilic, or an asymmetric (hydrophobic on one surface, hydrophilic on the other) material containing pores having a diameter between 1 nm to about 10 $\mu$m . The ions pass from the feed solution to the liquid extractant at the pores. The pores, therefore, should be of a sufficient size so as to permit the feed solution and extractant liquid to form an interface that allows solute to pass through the pores. The pores allow the feed solution and the liquid extractant to form an interface. In specific embodiments, in which the ionic species is a macromolecule such as a protein or nucleic acid, the pore size must be large enough to accommodate passage therethrough of the macromolecule.

As used herein, the term "nonporous material" refers to a material used to fabricate a vacuum member, e.g., a wall of a hollow fiber, to the interior of which a vacuum is applied. The nonporous material is nevertheless permeable to the vaporizable solutes. The nonporous hollow fibers may be, for example, silicone rubber capillaries, porous hollow fibers with an ultrathin nonporous skin of plasma polymerized silicone, or dip-coated silicone on the hollow fiber outer surface. Those skilled in the art will recognize that the above list of examples is not exhaustive.

The term "ultrathin" when referring to the thickness of a highly solute-permeable plasma polymerized nonporous silicone skin on the outside surface of the porous membrane means approximately 0.1 $\mu$m to 10 $\mu$m in thickness; preferably about 1 $\mu$m. This ultrathin nonporous skin is a significant barrier to permeation for the higher molecular weight liquid extractant molecules. The skin is developed by plasma polymerization on the microporous substrate. The skin develops an integral bonding with the substrate which has a much greater resistance to solvent swelling than conventional silicone rubber coatings. Examples of ultrathin nonporous skin include rubbers like dimethylsilicone, copolymers of silicone-polycarbonate, poly(1-trimethyl silyl-1-propyne), fluoroelastomers, polyurethane, and polyvinylchloride, to mention a few.

The term "hollow fiber membrane" or "HFM" refers to a microporous membrane that has a tubular or fiber structure, i.e., a hollow fiber made of a microporous material. The porous fiber wall may be symmetric or asymmetric.

According to the invention, porous membranes with a thickness range of 1 $\mu$m–40 $\mu$m are preferred. Preferably, the membrane is provided in the form of a hollow fiber, e.g., having an O.D. of 40 $\mu$m to 1000 $\mu$m and I.D. of 30 $\mu$m to 980 $\mu$m. However, other arrangements are also contemplated, such as sheets dividing one or more chambers (collectively the feed solution chamber, extractant chamber, back extraction chamber, etc.). The membrane should be mechanically strong enough to withstand the interface-immobilizing pressure difference imposed across the membrane. Reinforcement may be used if needed.

The membrane may swell in the presence of the feed solution or the extractant, but this is not a disadvantage as long as the swollen membrane is strong enough to withstand the interface-immobilizing pressure.

The term "hydrophobic" describes a substance which does not absorb or adsorb water. Preferred hydrophobic membranes include porous polyethylene, porous polytetrafluoroethylene (PTFE), porous polyimides, porous polyetheretherketones, porous polyvinylidene fluoride, porous polyvinylchloride, porous polysulfone, porous polyethersulfone, or porous polypropylene, for example, CELGARD® (Hoechst Celanese, SPD, Charlotte, N.C.). More specifically, the hydrophobic membranes may be CELGARD® brand porous polypropylene x-20 and x-10. Those skilled in the art will recognize that the above list of examples is not exhaustive.

The term "hydrophilic" describes a substance that readily associates with water. Preferred hydrophilic membranes include porous regenerated cellulose, porous cellulose acetate, porous cellulose acetate-nitrate, porous cellulose triacetate, microporous glass, porous porcelain, porous polyamides, porous hydrophilized polypropylene, porous polyesters, and porous polyacrylonitrile. The term "porous hydrophilized polypropylene" refers to a polypropylene that has been surface modified by derivitization with hydrophilic groups. Those skilled in the art will recognize that the above list of examples is not exhaustive.

The term "extractant solvent" refers to an organic liquid containing an agent that extracts ions, and that can be used to form a liquid membrane. Accordingly, an extractant solvent of the invention solvates ions. Generally, an extractant solvent of the invention will comprise a diluent and an agent that is specific for an ion. However, certain organic liquids, for example, tributyl phosphate (TBP), are capable of solvation of ions without an exogenous agent. Since the extractant liquid is an organic liquid, it will naturally have a high solubility for VOCs. Additionally, water should be sparingly soluble in the liquid extractant.

The term "diluent" refers to an organic liquid in which an agent specific for an ion is soluble, or which can itself solvate ions. The diluent forms the liquid "base" of the extractant solvent. In an embodiment in which the apparatus of the invention further provides for stripping of VOCs that are extracted into the extractant solvent, the diluent must be a high boiling organic liquid, i.e., a liquid with low volatility. In an embodiment of the invention in which the extractant solvent is present as a supported liquid membrane, it is particularly important that the diluent have very low solubility in water. In an embodiment of the invention in which the extractant solvent is infused or pumped through microporous hollow fibers, a fairly low viscosity diluent should be used to avoid too great a pressure drop across the hollow fibers. Examples of suitable diluents, depending on the specific application, include kerosene, decane, xylene, decanol, octanol, long chain alkanes, such as dodecane, vegetable oil, silicone oil, mineral oil, and the like. Kerosene, decane, and xylene are preferred for low viscosity applications. High boiling diluents, such as decanol, dodecane, other long chain alkanes, and the oils mentioned above are preferred for VOC extraction applications.

As noted above, the liquid extractant contains an agent or agents specific for an ion. These ion-specific agents are generally complexing agents that complex reversibly with the ionic solute. Such agents include, but are not limited to, crown ethers, liquid ion exchangers, chelating agents, acidic extracting agents (which have an exchangeable proton and are specific for cations), basic extracting agents (which are specific for anions), and the like. Acidic extracting agents are useful for complexing cationic species; for example, an acidic solvent S1 can be one or a mixture of hydroxyoximes with a molecular weight of 100 to 1000, one or a mixture of carboxylic acids with a molecular weight of 50 to 1000, one or a mixture of aryl sulfonic acids with a molecular weight of 50 to 1000, one or a mixture of $\beta$-diketones with a molecular weight of 50 to 1000, or one or a mixture of alkyl phosphoric acids with a molecular weight of 50 to 1000, generally at a concentration of between 1% to 100%, preferably to 50%, and more preferably to 20% v/v. In a specific example, the acidic solvent is LIX 84 (anti-2-hydroxy-5-nonylacetophenone oxime) diluted in heptane or kerosene. Basic extracting agents are useful for complexing anionic species. Examples for basic solvent S2 include one or a mixture of primary amines with a molecular weight of 50 to 1000, one or a mixture of secondary amines with a molecular weight of 50 to 1000, one or a mixture of tertiary amines with a molecular weight of 50 to 1000, or one or a mixture of quaternary amines with a molecular weight of 50 to 1000. Preferably, the basic agent is diluted to a concentration of from about 1% to about 100%, preferably about 50%, and more preferably about 20%, v/v, in a diluent such as heptane or kerosene. In a specific example, infra, the amine is a long chain alkylamines such as trioctyl amine, preferably in a concentration of 1% to 20% v/v. In a further embodiment, the extractant solvent S can be a mixture of a basic extractant and an acidic extractant, e.g., as shown in a specific example, infra, TOA and LIX 84 in kerosene with the total solvents concentration of 0.01M to 1.56M. Those skilled in the art will recognize that the above list of examples is not exhaustive.

As used herein, the term "stripping solution" refers to an aqueous solution that mediates back extraction of an ion from an organic extractant. Examples of basic aqueous solutions include but are not limited to NaOH, $KHCO_3$, $NaHCO_3$, $K_2CO_3$, or $Na_2CO_3$ at a concentration of from 0.01 wt/v % to 20 wt/v %. Examples of acidic aqueous solutions include but are not limited to sulfuric acid, nitric acid, hydrochloric acid, or phosphoric acid at a concentration of from 0.1 wt/v % to 90 wt/v %.

According to the invention, the extractant liquid forms a membrane in the pores of a microporous or porous membrane, separating different solutions from each other. For example, the feed solution will be separated from the extractant liquid (except for the contact that forms the liquid membrane). In a specific embodiment, the extractant liquid forms a supported liquid membrane (SLM) in the pore of a hydrophobic microporous membrane that separates an aqueous feed solution from an aqueous stripping solution. The SLM is generated or regenerated simply by passing the organic extractant solvent through the lumen (or bore) of the hollow fiber, or by placing the hollow fiber in contact with the extractant solvent on the shell side of the fiber. If the SLM is to separate two aqueous solutions, after infusing the organic extractant solvent through the lumen of the fiber, excess organic solvent can be washed out with the aqueous solution. Preferably, the hollow fiber is made of a hydrophobic material to stabilize the SLM.

In order to have effective solute transfer, an interface-immobilizing pressure difference should be imposed in a direction to oppose the tendency of the membrane-wetting liquid to pass through the membrane. In order to achieve this, a greater pressure is imposed on the liquid opposite to the membrane wetting-liquid in order to oppose the tendency of the membrane-wetting liquid to pass through the membrane. Thus, if a hydrophobic membrane is used, the aqueous feed solution must be introduced at a higher pressure than the extractant liquid. Alternatively, if a hydrophilic membrane is used, the aqueous feed solution must be introduced at a lower pressure than that of the extractant liquid.

The range of differences in pressure effective to immobilize the interface between a particular feed solution and extractant at a particular porous membrane depends on a number of factors, including the relative tendency of the feed solution and the extractant to wet the membrane material, the interfacial tension between the feed solution and the extractant, the flow characteristics of each liquid at the surface of the membrane, and the effective diameters of the pores of the membranes. Therefore, the maximum value of the pressure difference effective to immobilize the interface between the feed solution and the extractant at the porous membrane is optimally determined empirically. The minimum value should be zero when both phases are at the same pressure. A pressure difference range of 0–150 psi has been found to be suitable for certain applications. In a specific embodiment, a pressure of 8–10 psig was maintained for the aqueous stream and a pressure of 6–7 psig was maintained for the organic liquid, thus the pressure difference was 2–3 psig.

The regeneration of extractant, as accomplished in the present invention, is an important improvement to existing solute transfer devices. An advantage of the present invention is that saturation limitation of the extractant does not occur. In the past, the amount of solute transferred to the extractant had to be monitored so as to prevent saturation of the extractant. Thus, the present invention is more efficient than previous solute transfer devices.

Turning now to the drawings, in a specific embodiment of the invention the immobilized-interface metal ion solute-transfer unit (module) 100 shown in FIG. 1 has two separate sets of microporous hollow fibers 120 and 140, which enter the fluid-tight housing, or shell, 110 through inlets 212 and 222, respectively. Through the bore of one set of fibers 120 flows an acidic organic extractant, for example, LIX 84, in a diluent (S1) from reservoir 160, which is fed into the hollow fibers through conduit 162, past check valve 164, with pressure monitored by pressure gauge 166, by the action of pump 200; through the bore of the other set of fibers 140 flows a basic organic extractant such as TOA in a diluent (S2) from reservoir 180, which solvent is fed through conduit 182 past check valve 184, with pressure monitored by pressure gauge 186, by the action of pump 220. Metals present as cations ($Cu^{2+}$, $Zn^{2+}$, etc.) are extracted from the aqueous solution F from the reservoir 240 flowing under pressure for nitrogen cylinder 280 through conduit 260 through inlet port 112 into the shell side of the device 110 into the acidic extractant stream while metals present as anions ($HCrO_4^-$) are extracted into the basic extractant stream. The pressure of the feed solution is monitored by pressure gauge 282 and regulated by valve 284. In addition, the pressure of the feed solution is regulated by relief valve 242. After extraction, the feed solution flows through outlet port 114 through conduit 192 into effluent reservoir 190. The pressure of the feed solution effluent is monitored by pressure gauge 194, and flow controlled by check valve 196. Extractant solvent S1, laden with metal ion, exits through outlet port 214, and passes through conduit 215, with exit pressure monitored by pressure gauge 216 and flow controlled by check valve 218, into effluent reservoir 219. Similarly, solvent S2 exits through outlet port 224, and passes though conduit 225, with pressure monitored by pressure gauge 226 and flow controlled by check valve 228, into effluent reservoir 229.

Figure 1B:
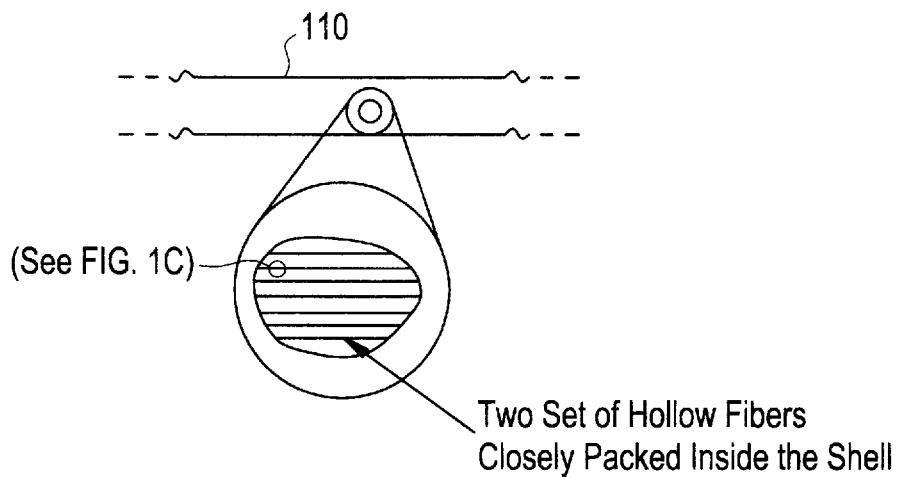
Figure 1C:
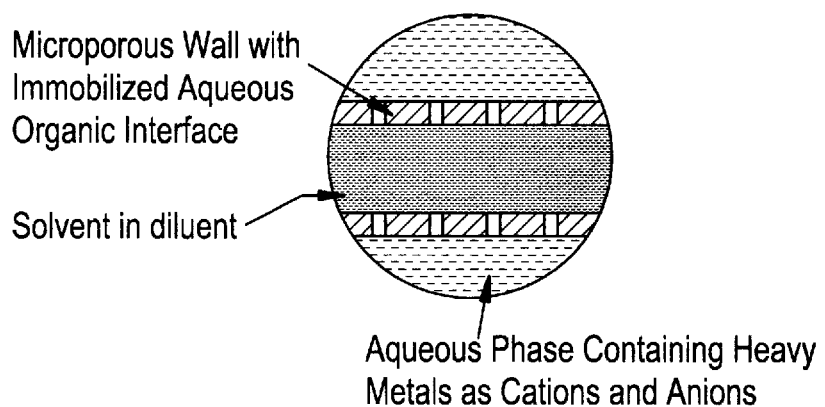

The arrangement of the two sets of hollow fibers is shown in an expanded view in FIG. 1B. A schematic diagram of a single hollow fiber, identifying the location of the extractant solvent in the bore (or lumen) of the hollow fiber and the aqueous feed solution in the shell side of the hollow fiber, and the immobilized aqueousorganic interface in the pore of the microporous wall of the hollow fiber, is shown in FIG. 1C.

As noted above, the extraction processes proceed synergistically, since the changes in pH that would be expected for each extraction independently advantageously offset each other. The extraction efficiency was significantly higher when both cationic and anionic species are extracted simultaneously, which will be demonstrated in detail in the examples given later. The Examples, infra, show that one such module (identified as Module 1) has been fabricated and used for this disclosure.

The module 100 of FIG. 1 can also be operated in such a way that through the bore of one set of fibers 120 flows an organic extractant S1 which may selectively extract a metal M1; through the bore of the other set of fibers 140 flows another organic extractant S2 which may preferentially extract a similar cationic metal M2. Thus, species M1 and M2 dissolved in the aqueous feed solution F which flows in the shell side will be concentrated into solvents S1 and S2, respectively, and simultaneously, and accordingly, the separation factor for each of the solvents S1 and S2 for metals M1 and M2 will be improved significantly via the competitive extraction of metals M1 and M2 by the solvents S1 and S2, respectively.

LIX 84 and Di-(2-ethylhexyl)phosphoric acid (D2EHPA) can individually and selectively extract $Cu^{2+}$ and $Zn^{2+}$, respectively and effectively under particular conditions. In conventional extraction operations, a lot of copper(II) and zinc(II) will be coextracted by D2EHPA and LIX 84, respectively, leading to a poorer separation of zinc(II) and copper(II). Much better, synergistic, separation can be achieved using the apparatus of the invention, e.g., as exemplified by FIG. 1 modified so that S1 and S2 are both specific for cations, but are selective for different cations, and in the Examples, infra.

Figure 3:
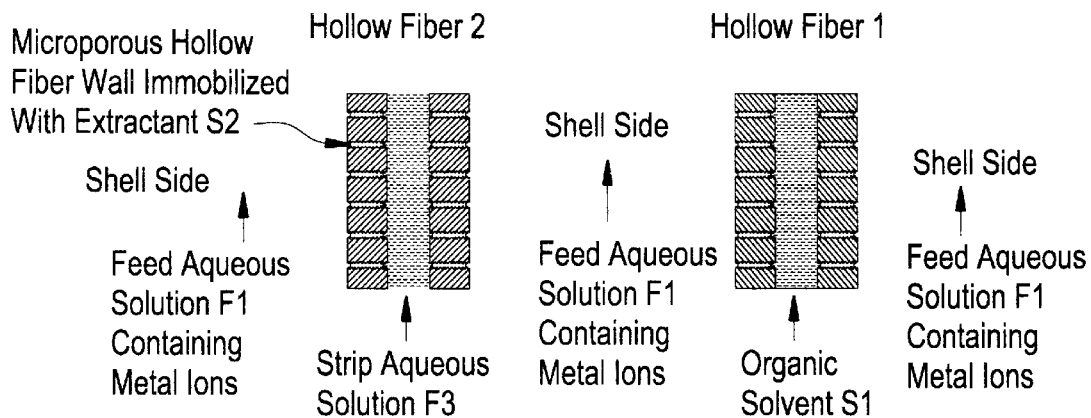
FIG. 3. Schematic of the synergistic extraction of cations in a module containing two sets of hollow fibers.
Figure 4:
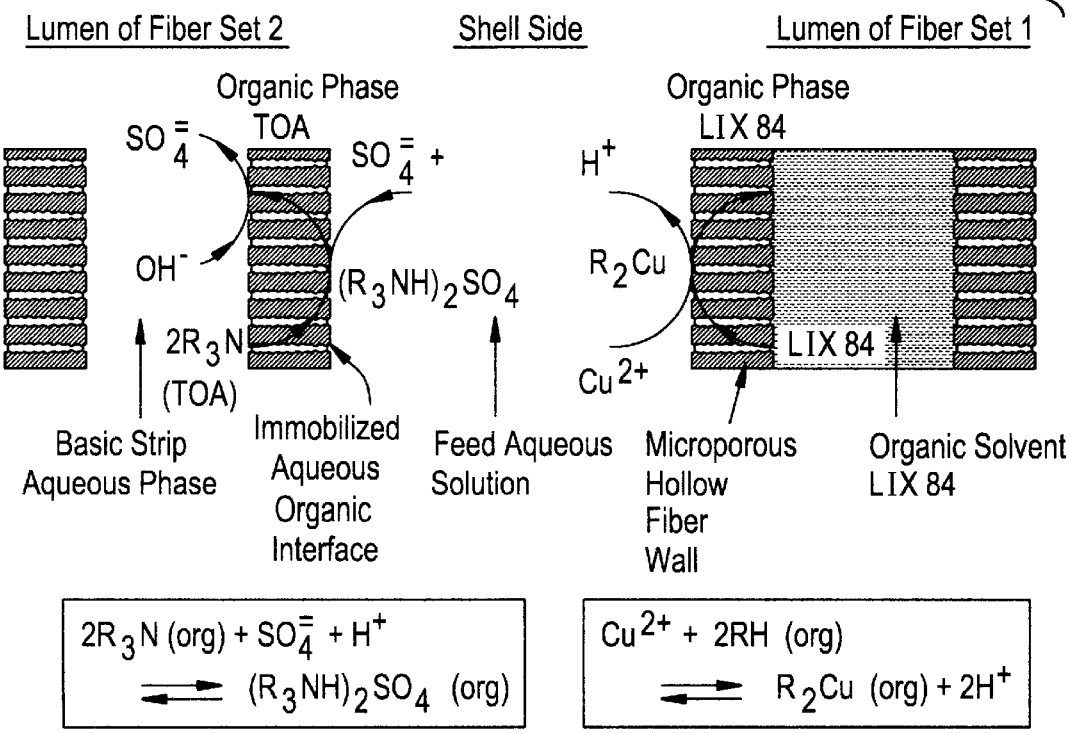
FIG. 4. Schematic of a synergistic extraction of $Cu^{2+}$ using organic solvent LIX 84 while the pH of an aqueous feed solution is kept under control by permeation and stripping of protons through a supported liquid membrane of an organic amine extractant in the pores of the second set of microporous fibers.

The module can also be operated in such a way that an aqueous feed solution flows through the shell side; through the bore of one set of fibers flows an acidic organic extractant S1 which may selectively extract cations and releases protons in the aqueous phase. To control pH of the feed solution another basic organic extractant S2 is immobilized in the pores of the walls of second set of fibers which extract protons; through the bore of this second set of fibers flows a basic aqueous solution F3 to pick up protons as shown in FIGS. 3 and 4. Thus, single cation or multiple cations dissolved in the aqueous feed solution F1 which flows in the shell side will be concentrated into solvents S1, while the strip aqueous solution F3 controls pH by extracting protons released during metal extraction into the extractant S1.

Figure 5:
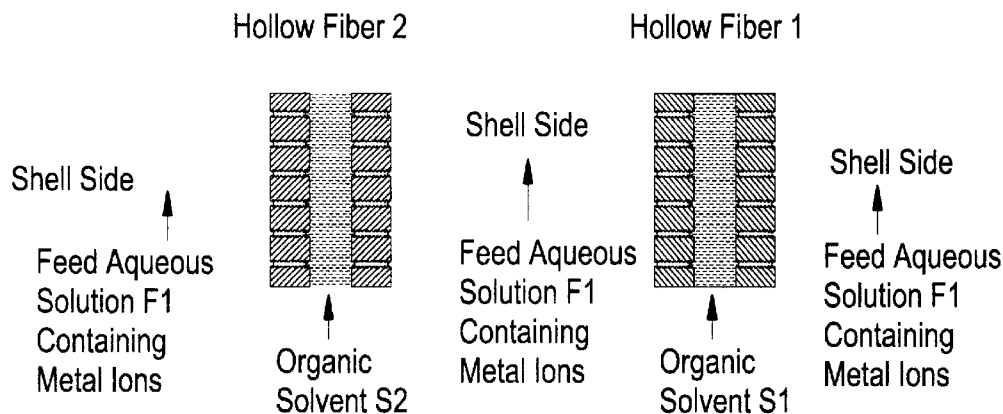
FIG. 5. Schematic of the synergistic extraction of cations in a module containing two sets of fibers where liberated protons are removed by organic extractant.
Figure 6:
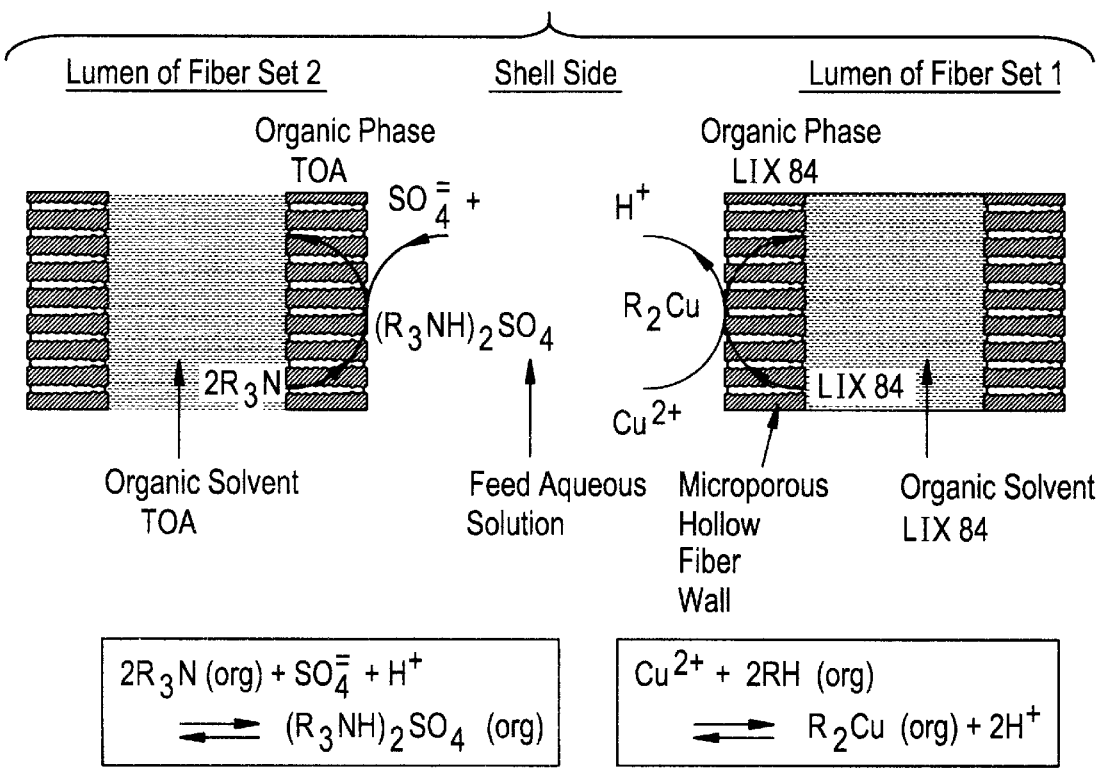
FIG. 6. Synergistic extraction of $Cu^{2+}$ using organic solvent LIX 84 while the pH of aqueous feed solution is kept under control by stripping the protons by a basic extractant flowing through the other set of fibers.

The same module can also be used in such a way that aqueous feed solution flows through the shell side; through the bore of one set of fibers flows an acidic organic extractant S1 which may selectively extract cations and releases protons in the aqueous phase. To control pH of the feed solution another basic organic extractant S2 flows through the bore of the other set of fibers to pick up protons as shown FIGS. 5 and 6. Thus, single cation or multiple cations dissolved in the aqueous feed solution F which flows in the shell side will be concentrated into solvents S1 and pH of the feed phase can be controlled.

Figure 7:
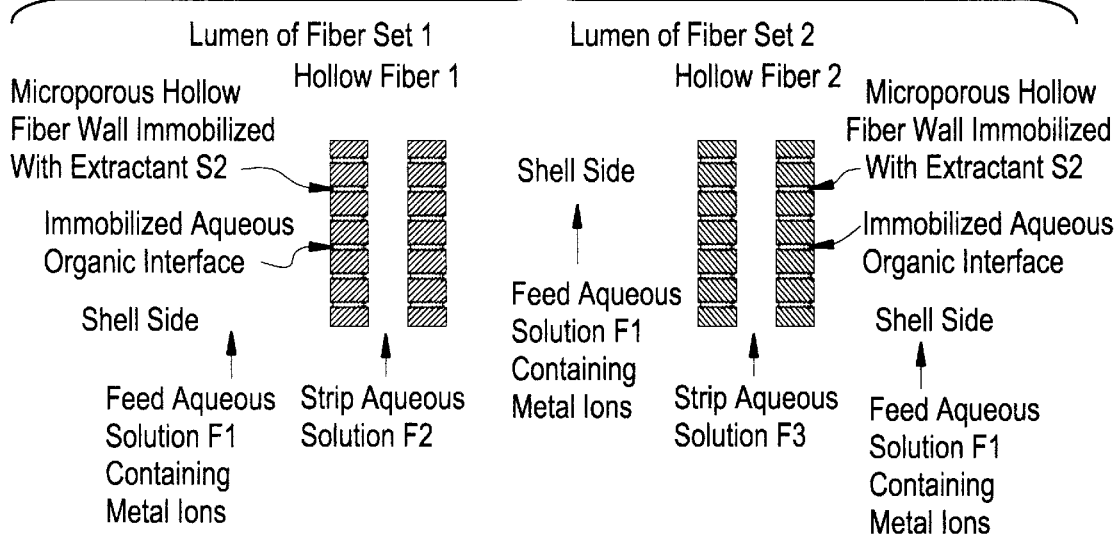
FIG. 7. Schematic of the synergistic extraction and stripping of heavy metal ions simultaneously in a module containing two sets of hollow fibers immobilized with extractants.
Figure 8:
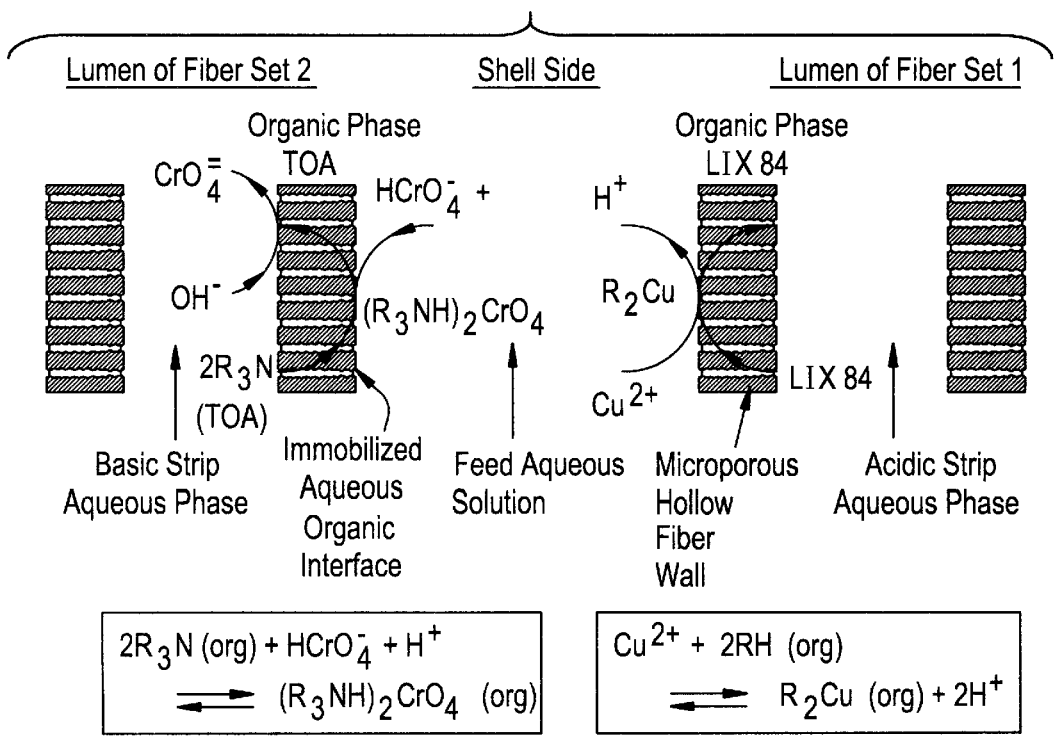
FIG. 8. Synergistic extraction and stripping of cation and anion in one module containing two set of hollow fibers, each set immobilized with a different organic extractant.

The same module arrangement can also be used to remove and concentrate multiple metals ions by immobilizing different extractants in the pores of the walls of the individual fiber sets as shown in FIG. 7. Organic extractant S1 can be immobilized in the pores of one set of fibers (set 1) which may selectively extract metal ion M1 at the feed-organic interface located at the outer diameter of the fiber; through the bore of that set of fibers flows an aqueous stripping solution F2 to concentrate metal species M1 at the organic-aqueous interface at the inner diameter of the fiber. Another organic extractant S2 is immobilized in the pores of walls of a second set of fibers which may preferentially extract a metal ion M2; through the bore of that set of fibers flows another stripping aqueous solution F3 to concentrate metal species M2. Thus, species M1 and M2 dissolved in the aqueous feed solution F1 which flows in the shell side will be concentrated into two different aqueous streams in one device via the competitive extraction of metals M1 and M2 by the solvents S1 and S2, respectively. The selection of the extractants S1 and S2 as well as the pHs of the stripping aqueous phases (F2 and F3) will be dictated by the nature of ions to be removed from the feed aqueous phase. Even within the acidic range, pH of the stripping solutions can be varied to remove and concentrate similar cations. On the other hand acidic solution can be infused through one set of fibers to concentrate cations, and basic solution can be infused through the other set of fibers to concentrate anions. This concept is illustrated in FIG. 8 for removal and recovery of metals ions like $Cu^{2+}$ and $HCrO_4^-$ present in water.

Thus, according to the invention, n-different sets of fibers with n-inlets and n-outlets can be arranged within one shell for a feed aqueous solution containing n or more ions, for example, mixed metal ions. In this embodiment, pores in the walls of each set of fibers can be immobilized with an extractant that is specific for one metal ion found among the n or more metal ions present in the feed solution. Stripping aqueous solution is infused through the bores of each set fibers to extract the metal ion from the extractant solvent, thus producing an effluent from each set of n-different sets of hollow fibers enriched for a particular metal ion. Thus, one device can generate multiple product streams enriched for individual metal ions extracted from one waste stream.

Naturally, after continuous operation, the SLM may begin to degenerate, e.g., from the additive effects of constant solubilization of the organic extractant in the aqueous solutions. Thus, in all the cases where the systems are operated in SLM mode the liquid membrane can be regenerated as often as necessary by infusing the organic extractant through the bore of the hollow fibers, followed by flushing with the aqueous solution.

The other technique presented in this invention is about the synergistic extraction of toxic metals by a mixture of different solvents, and subsequently, the specific stripping of the metals by simultaneous basic and acidic stripping steps. Thus, the metals which were extracted as anion would be easily stripped into the basic aqueous solution while the metals which were extracted as cation would be easily stripped into the acidic aqueous solution. The synergistic extraction of chromium(VI), copper(II), and zinc(II) by LIX 84 and TOA in a diluent and the separation of chromium(VI) and zinc(II) and copper(II) by anion and cation specific stripping will be used to demonstrate this technique.

Figure 9:
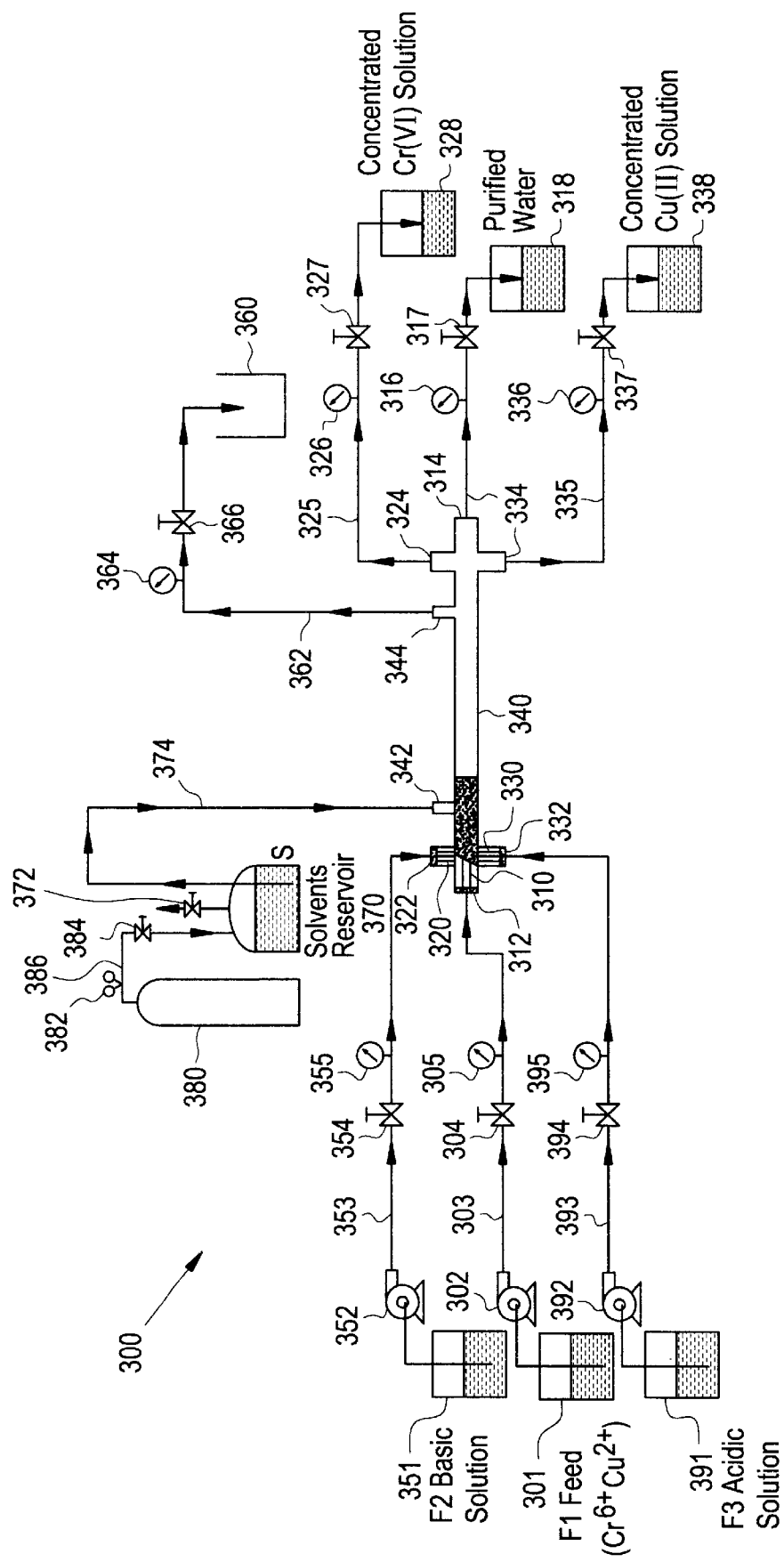
FIG. 9. Synergistic membrane-based extractor apparatus with three sets of fibers.

In another embodiment of the invention, a third module 300 (Module 3) is prepared with three well-intermingled sets of porous/microporous hollow fibers, as shown in FIG. 9. The three sets of fibers enter the module 340, which is a tube having T-fittings at both ends, through inlets 312, 322, and 332, and exit through outlets 314, 324, and 334, respectively. Through the bore of one set of hollow fibers 310 flows the aqueous feed solution F1 containing toxic metals. In operation, the feed solution F1 is pumped from reservoir 301 through conduit 303 with pump 302. The pressure of the feed solution is monitored with pressure gauge 305, and flow controlled with check valve 304. After exiting the module through conduit 315, with output pressure monitored with pressure gauge 316 and flow regulated with check valve 317, the now purified water is collected in collection reservoir 318. Through the bore of the second set of hollow fibers 320 flows a basic aqueous stripping solution F2 which will strip chromium(VI) from the extractant solvent S1 on the shell side of the microporous membrane. In operation, the stripping solution F2 is pumped from reservoir 351 through conduit 353 with pump 352. The pressure of the stripping solution is monitored with pressure gauge 355, and flow controlled with check valve 354. After exiting the module through conduit 325, with output pressure monitored with pressure gauge 326 and flow regulated with check valve 327, the stripping solution, now concentrated with chromium (VI), is collected in collection reservoir 328. Through the bore of the third set of hollow fibers 330 flows an acidic aqueous solution F3 which will strip copper(II) from the extractant solvent. In operation, the stripping solution F3 is pumped from reservoir 391 through conduit 393 with pump 392. The pressure of the feed solution is monitored with pressure gauge 395, and flow controlled with check valve 394. After exiting the module through conduit 335, with output pressure monitored with pressure gauge 336 and flow regulated with check valve 337, the stripping solution containing concentrated copper(II) is collected in collection reservoir 338.

A mixture of LIX 84 and TOA in a diluent (S) will be present in the shell (housing) of the module 340 as a liquid membrane. All aqueous solutions contact the organic extractants only in the micropores of the fibers by keeping the correct pressure difference between the aqueous phases and the organic membrane. Specially, the pressures of the three aqueous streams will be equal to or higher (without exceeding the breakthrough point) than that of the shell-side organic liquid membrane phase containing LIX 84 and TOA in a diluent for hydrophobic fibers. Any loss of the contained liquid membrane (e.g., through its solubility, albeit sparing, in the aqueous solutions) in the shell-side is compensated by connecting the extractant to a reservoir 370, via conduit 374 through inlet 342. A constant flow of solvent can be ensured under nitrogen pressure from cylinder 380 through conduit 386. Nitrogen pressure is monitored with pressure gauge 382, and flow controlled with check valve 384. The pressure in the solvent reservoir 370 is also under the control of release valve 372. Excess extractant solvent can be removed through outlet 344 connected via conduit 362 to a extractant solvent drain 360. The exit pressure of the extractant liquid is monitored by pressure gauge 364, and the flow is controlled by check valve 366. Preferably, automatic controls monitor the amount of the extractant solvent and provide for infusion or removal of solvent, as required.

In operation of the system, metals ions present in the feed solution F1 are synergistically extracted into the mixed extractant solvent, S. Chromium(VI) and copper(II) are simultaneously stripped from the extractant solvent and concentrated into the aqueous basic F2 and aqueous acidic F3 solutions, respectively flowing through the two separate hollow fibers. The feed solution F1, now free of metal ions, exits the housing through outlet port 314. The stripping solvents F2 and F3 exit the housing through outlet port 324 and 334. The concentrated metals present in the stripping solutions can be efficiently and economically recovered.

Figure 10A:
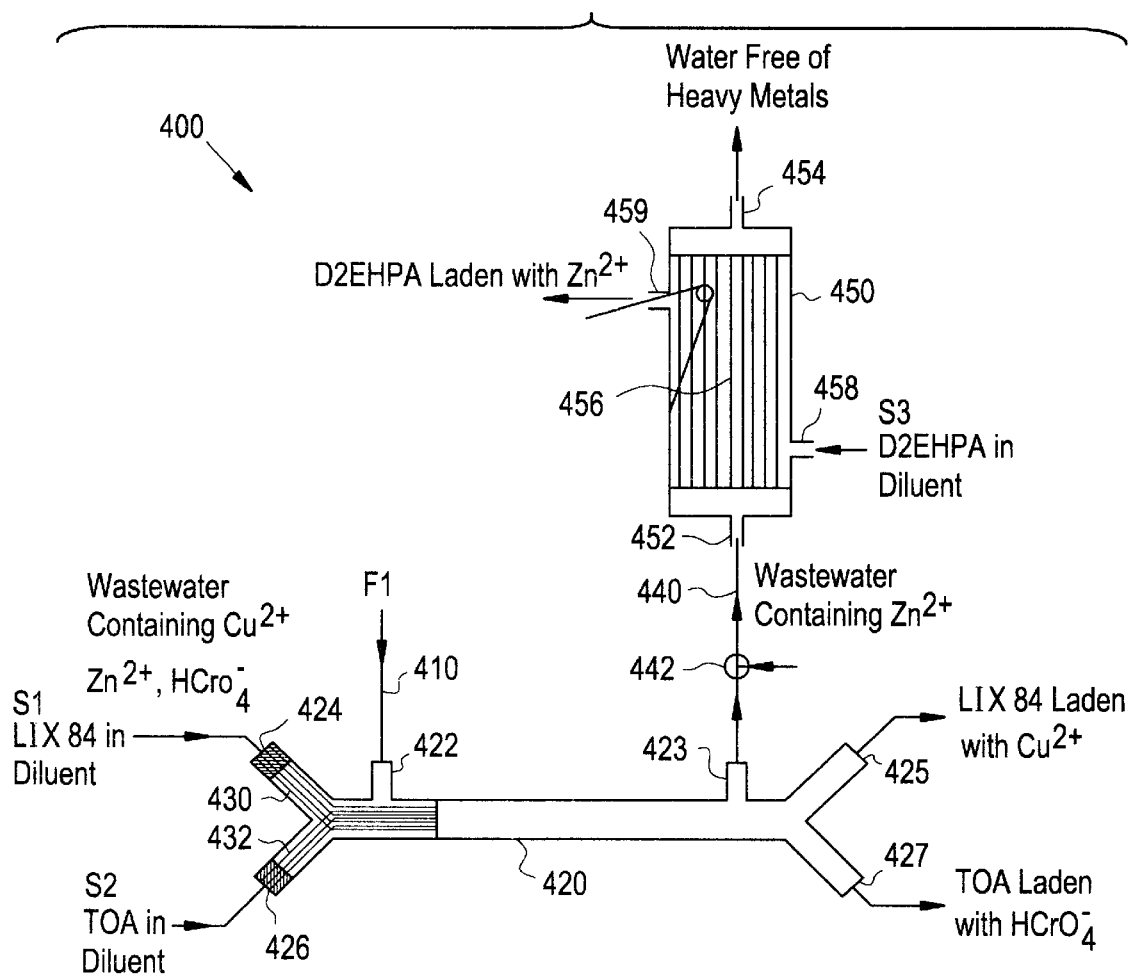
FIG. 10(A,B). Schematic of an apparatus for the synergistic extraction and separation of Cu(II), Zn(II), and Cr(VI) in the HFM Modules.
Figure 10B:
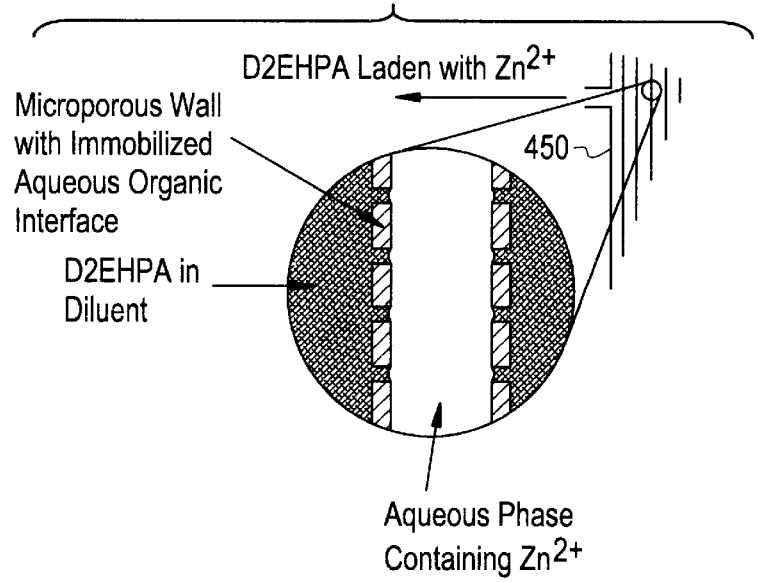

In FIG. 10, another embodiment of the invention, yet a further membrane modular assembly 400 is provided. This modular assembly provides for individual separation of heavy metal ions from an aqueous solution containing $Cu^{2+}$, $HCrO_4^-$, and $Zn^{2+}$. In this embodiment, the aqueous feed solution F1 is fed via a conduit 410 into a shell 420 through an inlet 422. Two sets of hollow fibers, one 430 through which an extractant solvent S1, such as LIX 84 in diluent, for cationic metal ions passes, and the second 432 through which a basic extractant solvent S2, such as TOA in diluent, for anionic metal ions passes, are provided through inlets 424 and 426, respectively. The copper(II) and chromium(VI) are extracted from the feed solution into solvents S1 and S2, respectively, which are removed from the shell through outlets 425 and 427, respectively. The feed solution F1 then exits the shell 420 through outlet 423 and passes through conduit 440 into microporous hollow fibers 456 in a second single fiber set module 450 through inlet 452. The pH of the feed solution exiting module 420 via outlet 423 to module 450 may be adjusted by infusion with an acid or base through injection chamber 442. A third extractant solvent specific for the third metal ion, $Zn^{2+}$, e.g., solvent containing D2EHPA, is infused though inlet 458 of the shell to extract the third metal ion ($Zn^{2+}$) from the feed solution. The extractant solvent exits the shell through outlet 459, while the aqueous feed solution, now stripped of metal ions, exits through outlet 454.

It can be appreciated that the location of the feed solution and extractant solvent in shell 450 could be reversed, i.e., the feed solution could be fed through the shell as in shell 420, while the extractant is fed through the hollow fibers 456. A countercurrent flow configuration can also be employed.

The metal ion laden solvent effluents from the modular assembly depicted in FIG. 10 can be stripped of the metal ions, e.g., preferably using separate hollow fiber solvent back extraction systems, or standard back extraction techniques.

In a specific embodiment, infra, the microporous hollow fibers used to fabricate modules 1 3, and 4 are made of hydrophobic polypropylene (Celgard X-10, 100 $\mu$m I.D., 150 $\mu$m O.D., pore size, 0.03 $\mu$m; Hoechst Celanese SPD., Charlotte, N.C.). Transparent Teflon FEP tube (1.27 cm I.D. and 1.43 cm O.D.; Cole Parmer, Chicago, Ill.) was used as shell along with polypropylene Y-fittings or T-fittings at two ends for modules 1 and 3, respectively. The transparent shell had an added advantage of allowing the observation of any change in the module during operation. Opaque teflon pipe with an I.D. of 0.61 cm and an O.D. of 1.03 cm (Cole Parmer, Chicago, Ill.) with polypropylene Y fittings was used with Module 4, which corresponds to module 450 in FIG. 10. The detailed geometrical characteristics of the modules are presented in Table 1.

TABLE 1

Geometrical Characteristics of Hollow Fiber Modules

| Module # | Module Type | Length (cm) | Module Diameter (cm) | Number of Fibers[a] | Surface Area/ Volume ($cm^{-1}$) | Fiber Packing Fraction |
|---|---|---|---|---|---|---|
| 1 | Two Fiber Sets | 29.2 | 1.27 | 1000 | 74.4 | 0.28 |
| 3 | Three Fiber Sets | 41 | 1.27 | 420 | 46.9 | 0.18 |
| 4 | Single Fiber Set | 32 | 0.61 | 600 | 96.8 | 0.363 |

[a]The fiber number on each side or set.

The main advantages of the hollow fiber membrane-based techniques presented in the present invention may be summarized as follows:

1. High stage separation factors can be achieved.
2. The capital and operating costs and energy requirements are low.
3. Fewer moving parts are used, resulting in less maintenance.
4. Extractant loss due to poor coalescence is totally eliminated.
5. Compact and modular hollow fiber devices can be used with exceptionally high mass transfer area per unit equipment volume.
6. The mass transfer rate can be enhanced by using reversible and irreversible chemical reactions.
7. The extraction and stripping can proceed simultaneously in the same module.
8. Synergistic extraction and separation of the solutes may be achieved.
9. The extraction selectivity can be enhanced.
10. Flexibility in arrangement of the modules, i.e. they may be arranged either vertically or horizontally, either in series or in parallel. The fluids can continuously flow in the modules either countercurrently or cocurrently.

The following examples are provided as illustrative of the present invention. The enumeration of details, however, is not to be considered as restrictive of the scope of invention.

EXAMPLE 1

Figure 11:
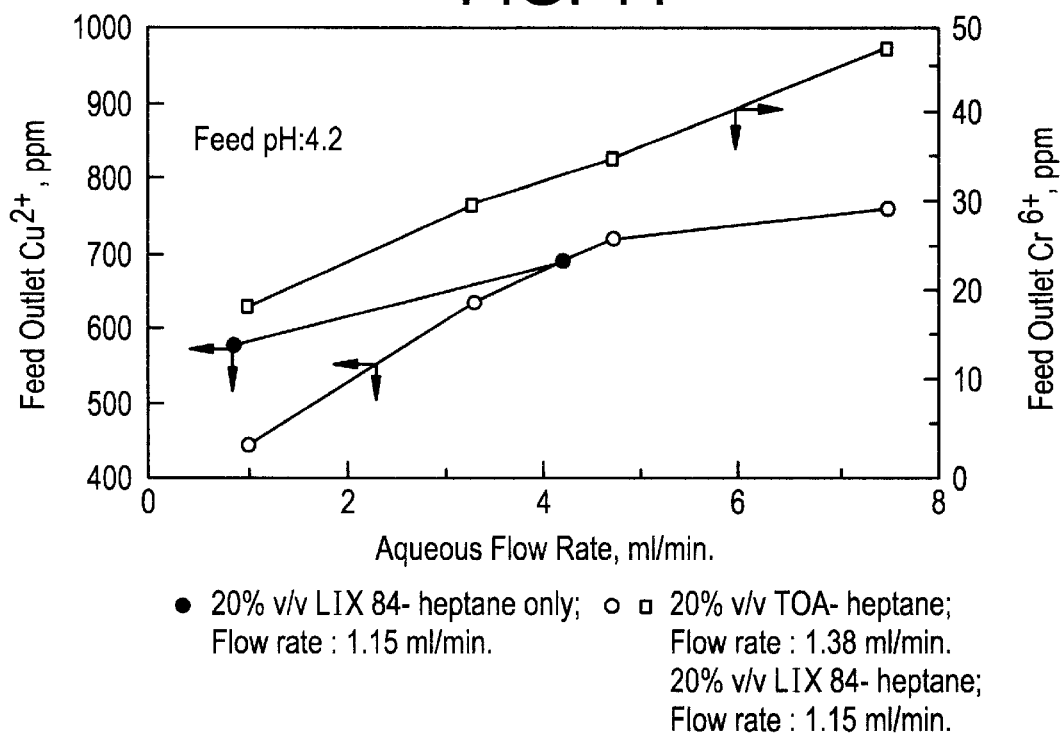
FIG. 11. Effect of aqueous feed flow rate variations on the extraction of $Cu^{2+}$ and $Cr^{6+}$ from an aqueous feed of 1268 ppm $Cu^{2+}$ and 237.4 ppm $Cr^{6+}$ (Module 1).
Figure 12:
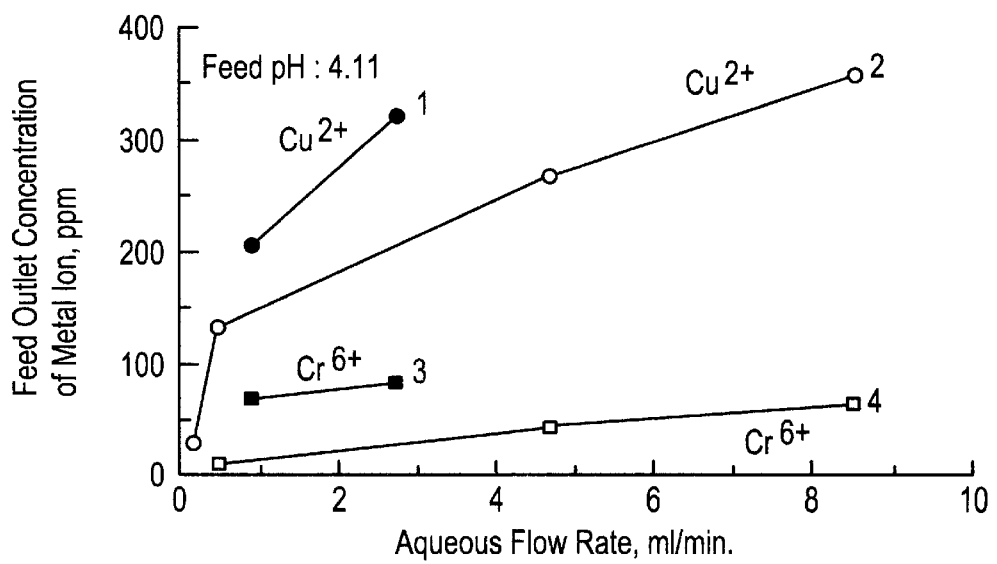
FIG. 12. Effect of aqueous feed flow rate variations on the extraction of $Cu^{2+}$ and $Cr^{6+}$ from an aqueous feed of 536 ppm $Cu^{2+}$ and 129 ppm $Cr^{6+}$ (Module 1).

The effects of aqueous flow rate variations on the extraction of copper(II) and chromium(VI) in Module 1 using two different feed aqueous concentrations of $Cu^{2+}$ and $Cr^{6+}$ are shown in FIGS. 11 and 12. Feed concentrations of $Cu^{2+}$ and $Cr^{6+}$ were 1268 ppm and 237.4 ppm, pH 4.2, respectively in FIG. 11 and 536 ppm and 129 ppm, pH 4.11, respectively in FIG. 12. Feed outlet concentration of chromium is shown with open squares, and feed outlet concentration of copper is shown with open circles. In both experiments, the first extractant solvent is 20% v/v TOA in heptane infused at a flow rate of 1.38 ml/min (FIG. 11) or 0.5 ml/min (FIG. 12), and the second extraction solvent is 20% v/v LIX 84, infused at a flow rate of 1.15 ml/min (FIG. 11) or 0.5 ml/min (FIG. 12). In once-through continuous operation, an exit aqueous stream concentration of 19 ppm $Cr^{6+}$ and 440 ppm $Cu^{2+}$ was obtained at a low aqueous feed flow rate (FIG. 11) starting from high feed $Cu^{2+}$ and $Cr^{6+}$ concentrations. A much greater reduction in exit concentrations was achieved for reasonable feed concentrations of $Cu^{2+}$ and $Cr^{6+}$ when the feed flow rate was reduced to the low value of 0.5 ml/min (FIG. 12). The concentrations of the metals in the aqueous phase were analyzed by a Thermo-Jarrel Ash Model 12 Atomic Absorption Spectrophotometer (AAS). This method of metal analysis was followed in all subsequent examples.

EXAMPLE 2

The synergy resulting from the extraction process employed in Module 1 as demonstrated in Example 1 is illustrated here via another extraction experiment, corresponding to a prior art single fiber HFM extraction system. The experiments were done in Module 1 with only 20% v/v LIX 84 in heptane in the set of fibers meant for copper, and waste water flowing on the shell side. No extractant solvent was placed in the second set of hollow fibers (in Example 1, these contained a flow of TOA in heptane for extraction of chromium(VI)). The results of these experiments are also illustrated in FIGS. 11 and 12 (solid circles for copper(II) concentration, and solid squares for chromium(VI) concentration). These data showed that the amount of copper (II) extraction was significantly lower compared to the cases in which simultaneous chromium(VI) extraction was going on.

Figure 13:
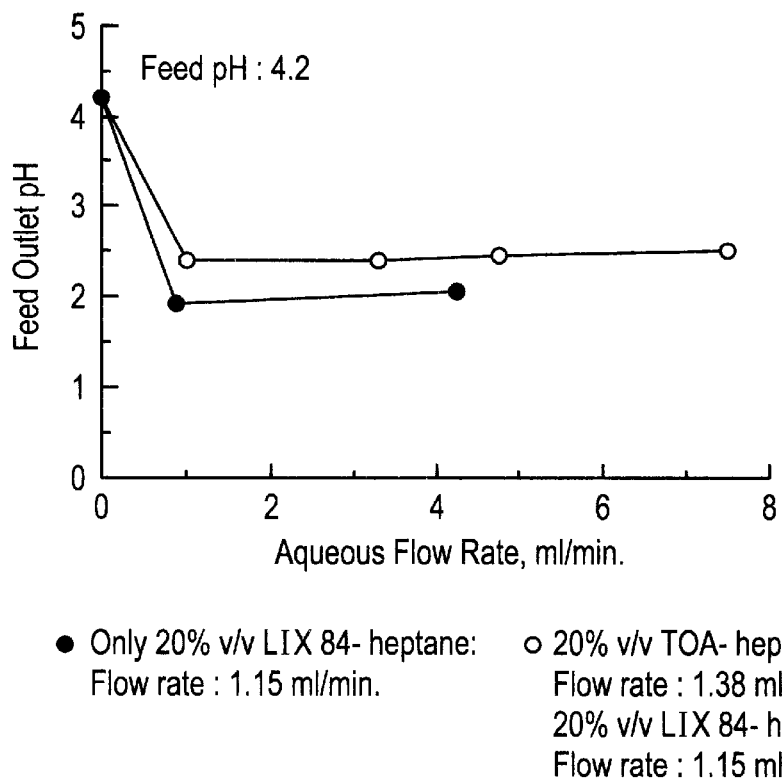
FIG. 13. Effect of aqueous feed flow rate variations on the feed outlet pH for an aqueous feed of 1268 ppm $Cu^{2+}$ and 237.4 ppm $Cr^{6+}$ (Module 1).
Figure 14:
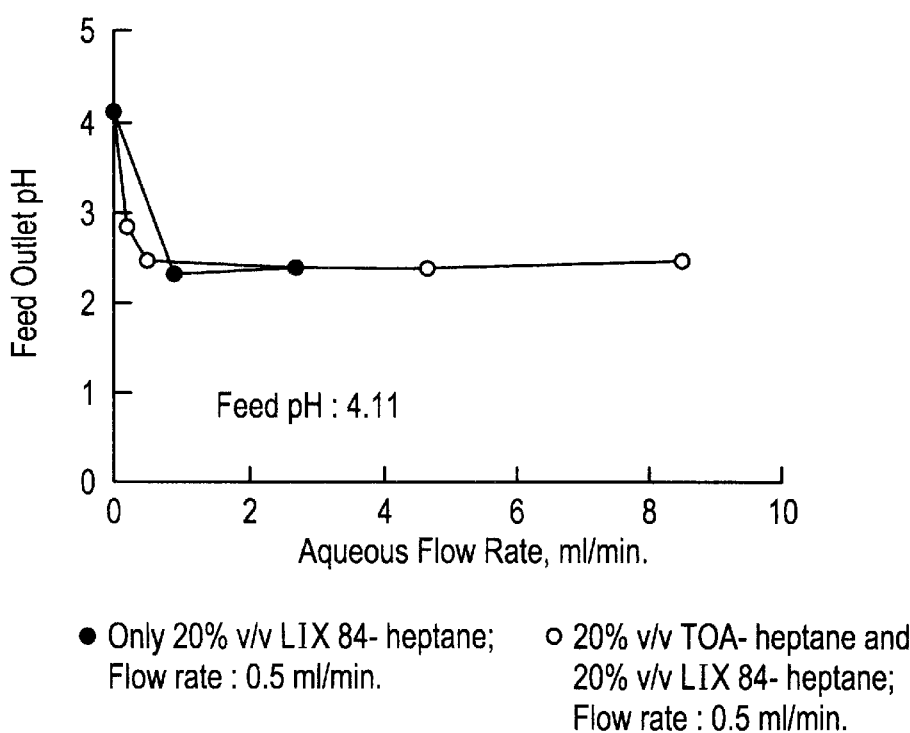
FIG. 14. Effect of aqueous feed flow rate variations on the feed outlet pH for an aqueous feed of 536 ppm $Cu^{2+}$ and 129 ppm $Cr^{6+}$ (Module 1).

The pH of the treated waste water was measured in each case (shown in FIGS. 13 and 14, corresponding to FIGS. 11 and 12, respectively) which demonstrate that pH was much more stable when a cation and an anion were extracted simultaneously (open circles) than when one was extracted preferentially (solid circles).

EXAMPLE 3

Figure 15:
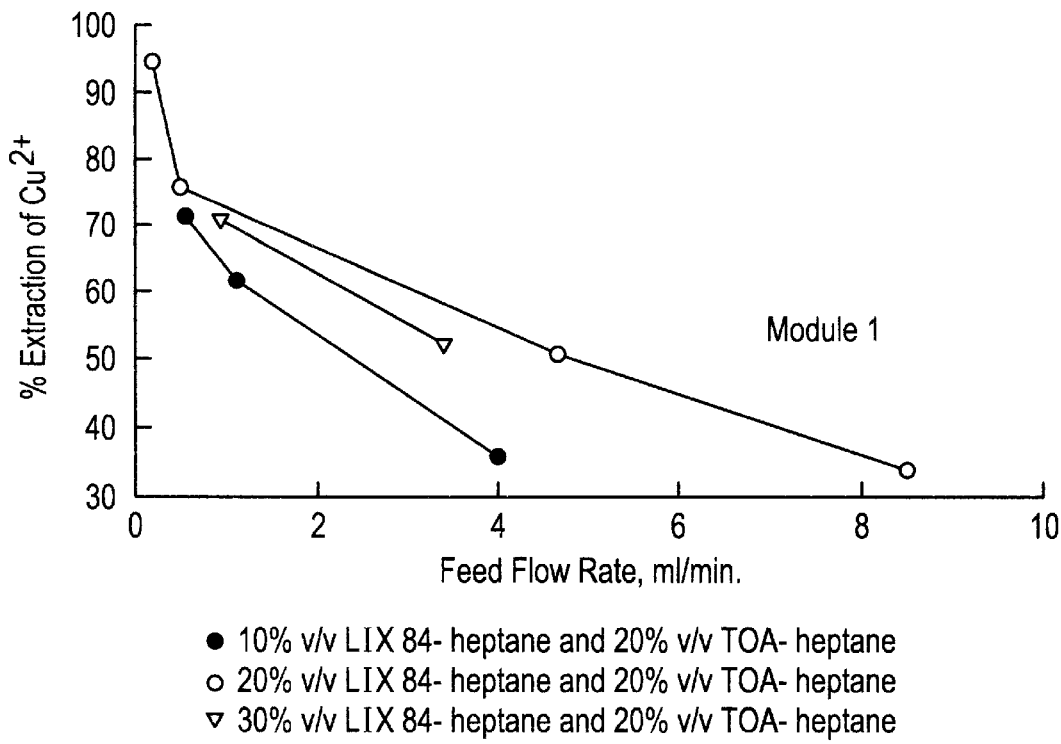
FIG. 15. Effect of variations in the concentration of LIX 84 on the extraction of $Cu^{2+}$ from an aqueous feed of 536 ppm $Cu^{2+}$ and 129 ppm $Cr^{6+}$.
Figure 16:
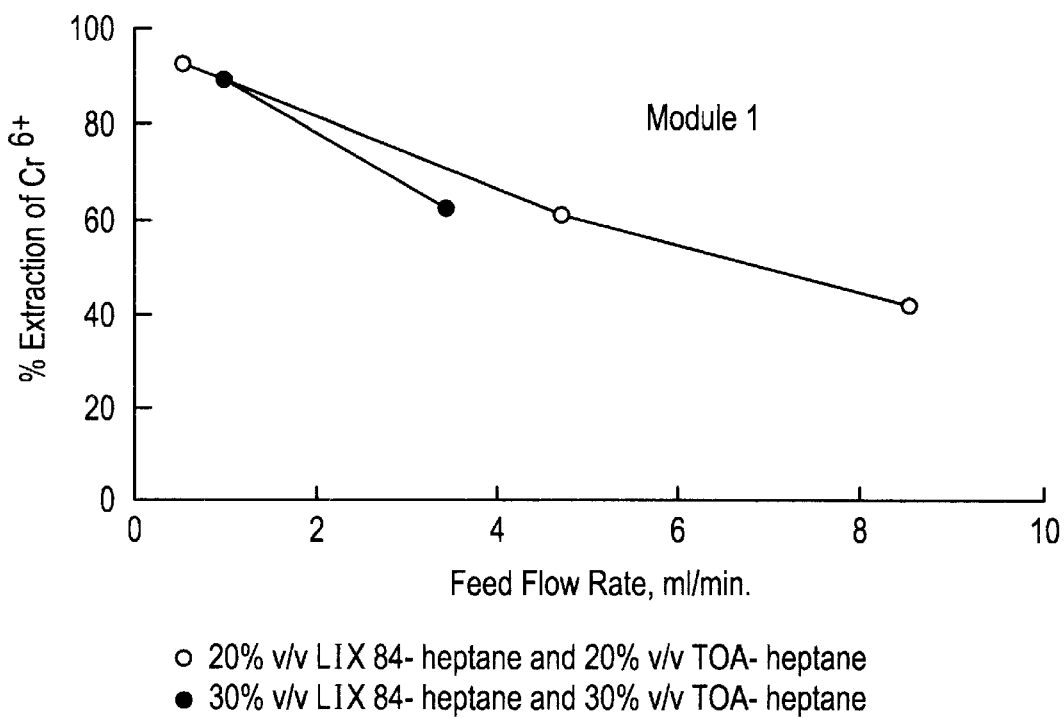
FIG. 16. Effect of variations in the extractant concentrations on the extraction of $Cr^{6+}$ from an aqueous feed of 536 ppm $Cu^{2+}$ and 129 ppm $Cr^{6+}$.

The experiments reported in this Example were conducted in Module 1 following a procedure similar to Example 1. The results of varying the concentration of one extractant while keeping the concentration of the other extractant constant are illustrated in FIGS. 15 for extraction of copper (II) (flow rate of extraction solvents was 0.5 ml/min) and 16 for extraction of chromium(VI) (flow rate of extraction solvents was 0.5 ml/min). The extraction rate of copper(II) from the feed aqueous phase increased with an increase in the LIX 84 concentration from 10% v/v (filled circles) to 20% (open circles) (FIG. 15; the TOA concentration was kept at 20% v/v for all extraction experiments shown in FIG. 15). This trend was not observed when the LIX 84 concentration was increased from 20 to 30% (open triangles) (FIG. 15), and similar results were observed when the concentration of TOA was also increased to 30% v/v (FIG. 16, 20% LIX 84 and 20% TOA—open circles; 30% LIX 84 and 30% TOA—filled circles).

Presumably, the decrease in extraction efficiency with increasing concentration of LIX 84 or TOA above 20% v/v is a consequence of the higher viscosity of the extractant solvent at that concentration, which would lower the diffusional transport rate through the pores.

EXAMPLE 4

The experiments reported in this Example were conducted in Module 1 with LIX 84 in kerosene in one set of fibers and pure kerosene in the other set of fibers, with waste water containing zinc(II) and copper(II) flowing on the shell side. The results are shown in Table 2, Series No. 4.

EXAMPLE 5

The experiments reported in this Example were conducted in Module 1 with D2EHPA in kerosene in one set of fibers and pure kerosene in the other set of fibers, with the waste water containing zinc(II) and copper(II) flowing on the shell side. The results are shown in Table 2, Series No. 3.

EXAMPLE 6

The experiments reported in this Example were conducted in Module 1 with LIX 84 in kerosene in one set of fibers and D2EHPA in kerosene in the other set of fibers, with waste water containing zinc(II) and copper(II) infused on the shell side. The results are shown in Table 2, Series Nos. 1 and 2.

Comparison of the data for series 1 and 2 with series 3 and 4 in Table 2 indicates that there is significant synergy for the extraction and separation of zinc(II) and copper(II) in Module 1 with LIX 84 in diluent and D2EHPA in diluent simultaneously present in the two separate sets of fibers, respectively. The coextraction of zinc(II) by LIX 84 and copper(II) by D2EHPA is greatly reduced under these conditions.

TABLE 2

Comparison Of The Distribution Of Copper Zinc In D2EHPA-kero.[a] and LIX 84-kero.

| | Inlet | | | | | Outlet[b] | | | | | |
| | D2EHPA | LIX 84 | | | | D2EHPA in kero. | | | LIX 84 in kero. | | |
| | in | in | Feed | | | | | [Cu]/ | | | [Zn]/ |
| Series No. | kero. (v/v %) | kero. (v/v %) | pH | Zn ppm | Cu ppm | Zn ppm | Cu ppm | [Zn] % | Zn ppm | Cu ppm | [Cu] % |
|---|---|---|---|---|---|---|---|---|---|---|---|
| 1 | 10 | 10 | 1.59 | 469 | 688 | 444 | 18.4 | 4.1 | 30.0 | 876 | 3.4 |
| 2 | 10 | 10 | 1.96 | 466 | 536 | 1070 | 29.8 | 2.8 | 43.4 | 914 | 4.7 |
| 3 | 10 | 0[c] | 1.98 | 482 | 540 | 832 | 48.7 | 5.9 | | | |
| 4 | 0[d] | 10 | 1.98 | 482 | 540 | | | | 158 | 594 | 26.6 |

[a]kero. = kerosene; the flow rate of the extractants in the fibers is about 0.5 ml/min; the feed flow rate is about 1.5 ml/min.
[b]The metals in the solvents are stripped into aqueous sulfuric acid solutions and analyzed with AAS.
[c]100% kerosene flows in this set of fibers, Example 5.
[d]100% kerosene flows in this set of fibers, Example 4.

EXAMPLE 7

The experiments reported in this experiment were conducted in Module 1 with LIX 84 in diluent in one set of fibers and D2EHPA in diluent in the other set of fibers. The waste water contained zinc(II) and copper(II) infused on the shell side. By increasing the flow rate of LIX 84 from 0.44 to 3.5 ml/min, while keeping the flow rate of D2EHPA constant (0.5 ml/min), the coextraction of zinc(II) by LIX 84 was raised from 3.4% to 10.5%. If the flow rate of LIX 84 was kept constant (0.5 ml/min) while increasing the flow rate of D2EHPA from 0.42 to 2.2 ml/min, the coextraction of copper(II) by D2EHPA was raised from 3.3% to 6.5%. Thus, the distribution of the metals in D2EHPA and LIX 84 may be adjusted by changing the flow rates of the extractants.

EXAMPLE 8

The experiments reported in this example were conducted in Module 1 with LIX 84 in diluent in one set of fibers and D2EHPA in diluent in the other side of fibers. The waste water contained zinc(II) and copper(II) and was infused on the shell side. By increasing the concentration of LIX 84 from 10 to 30 v/v % while keeping the flow rate of D2EHPA (10 v/v %) constant, the coextraction of zinc(II) by LIX 84 is nearly the same. If the flow rate of LIX 84 (10 v/v %) was kept constant while increasing the concentration of D2EHPA from 10 to 30 v/v %, the coextraction of copper(II) by D2EHPA was raised from 5.5% to 9.9%. Thus, the distribution of the metals in D2EHPA and LIX 84 may be adjusted by changing the concentrations of the extractants.

EXAMPLE 9

The experiments in this example were conducted in batch mode. Thirty ml aqueous feed solution containing about 530 ppm zinc(II) and 440 ppm copper(II) at different pH values was stirred with 30 ml 10 v/v % LIX 84 in heptane or 20 v/v % D2EHPA in heptane at room temperature for 20 minutes. The concentrations of the metals in the aqueous phase were analyzed following the same procedure used for the analysis in Examples 1–8, namely, by a Thermo-Jarrel Ash Model 12 Atomic Absorption Spectrophotometer (AAS). The results shown in Table 3 indicate that within the experimental pH range presented, the selectivity of the extractants for zinc(II) and the copper(II) increases significantly as the feed pH value declines.

TABLE 3

EXAMPLE 10
Extraction Of Zinc (II) And Copper (II)
With LIX 84 and D2EHPA[a]

| Solvent | Feed pH | pHeq[b] | Extn. of $Zn^{2+}$, % | Extn. of $Cu^{2+}$, % |
|---|---|---|---|---|
| 10% LIX 84 in heptane | 4.21 | 2.01 | 10.2 | 99.4 |
| 20% D2EHPA in heptane | 4.21 | 1.79 | 99.9 | 32.1 |
| 10% LIX 84 in heptane | 2.38 | 1.92 | 7.9 | 99.4 |
| 20% D2EHPA in heptane | 2.38 | 1.76 | 99.9 | 24.4 |
| 10% LIX 84 in heptane | 1.84 | 1.77 | 7.3 | 98.6 |
| 20% D2EHPA in heptane | 1.84 | 1.68 | 99.8 | 11.4 |
| 10% LIX 84 in heptane | 1.59 | 1.48 | 0.5 | 97.6 |
| 10% D2EHPA in heptane | 1.59 | 1.47 | 74.7 | 9.10 |

[a]Feed: copper (II) = 440 ppm, zinc (II) = 540 ppm; mixed for 20 minutes at room temperature.
[b]pHeq: pH at extraction equilibrium.

EXAMPLE 10

Figure 17:
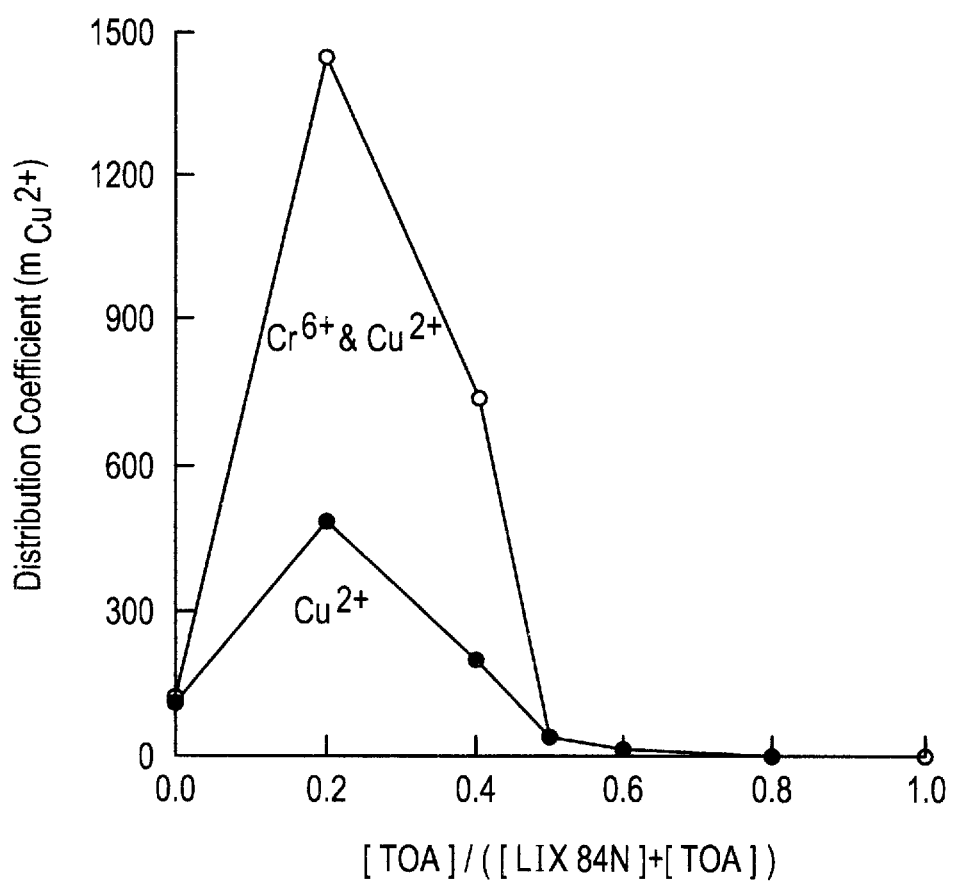
FIG. 17. The relationship between the distribution coefficients of $Cu^{2+}$ and the molar ratios of the solvents.
Figure 18:
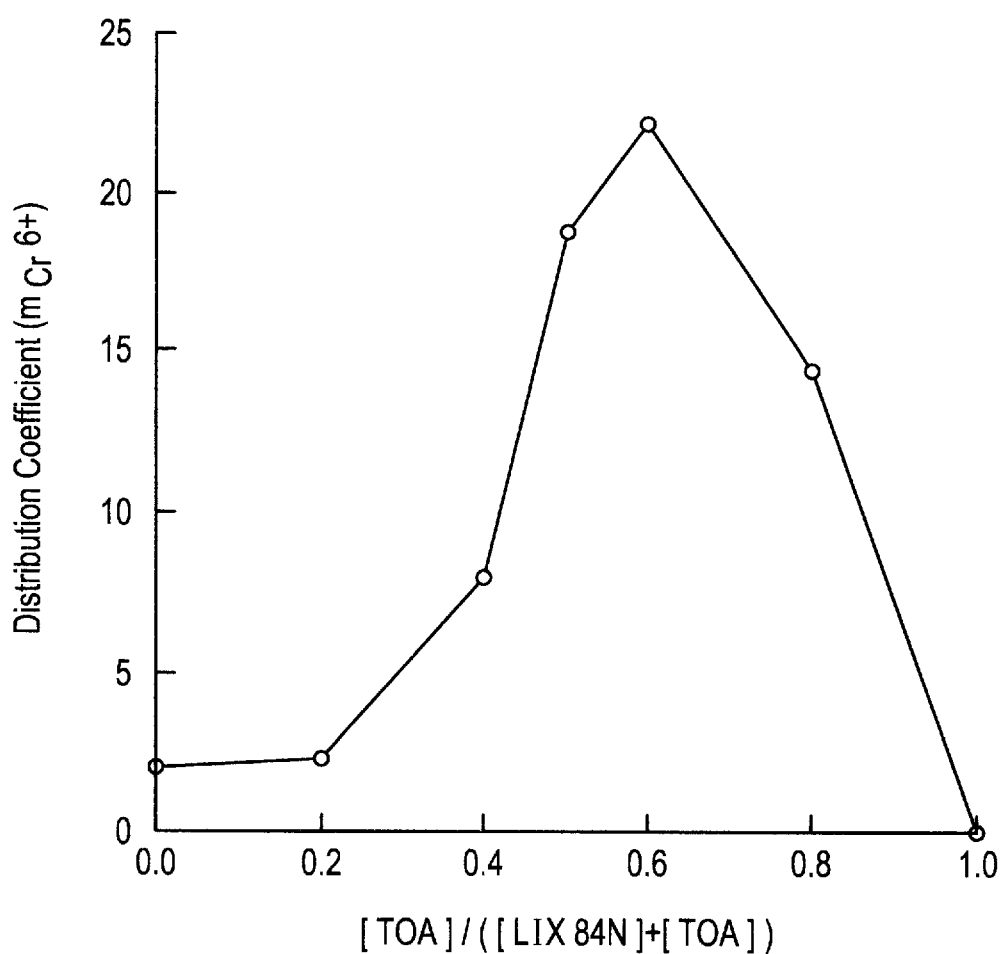
FIG. 18. The relationship between the distribution coefficients of $Cr^{6+}$ and the molar ratios of the solvents.

Batch experiments were conducted in flasks to illustrate the extraction that can be achieved in Module 3, e.g., and described in FIG. 9. Thirty ml of aqueous feed solution containing about 250 ppm chromium(VI) and 1091 ppm copper(II) was stirred with 30 ml mixtures of various ratios of TOA and LIX 84 in heptane (total solvents concentration= 0.156M) for 30 minutes. The concentrations of each metal in the aqueous phase after extraction was measured according to the same analytical method as in Example 1. The results are illustrated in FIGS. 17 (chromium(VI) and copper(II), open circles; copper(II), filled circles) and 18 (chromium (VI), open circles), which indicate that significantly synergistic extraction of copper(II) and chromium(VI) can be achieved with a mixture of TOA and LIX 84 in heptane. More than 99.9% of the metals may be recovered in only one extraction step.

EXAMPLE 11

Batch experiments were conducted following the procedure of Example 10. The mixture of organic solvents loaded with the metals Cr(VI) and Cu(II) was stirred with different volumes of 10 v/v % $H_2SO_4$ and 4 wt/v % $NaHCO_3$ respectively and consecutively. Thus copper(II) and chromium(VI) would be stripped and concentrated into 10 v/v % $H_2SO_4$ and 4 wt/v % $NaHCO_3$ solution, respectively (Table 4), leading to a thorough separation and recovery of these metals.

TABLE 4

The Stripping Of Cr (VI) and Cu (II) With
Sulfuric Acid And Sodium Bicarbonate

| A/O* | pH | Cr(aq) ppm | Cr(org) ppm | Es(Cr) % | Cu(aq) ppm | Cu(org) ppm | Es(Cu) % |
|---|---|---|---|---|---|---|---|
| 1/2 | 9.51 | 422.7 | 57.1 | 88.0 | 1913 | 224.2 | 89.5 |
| 1/3 | 9.29 | 649 | 71.0 | 90.1 | 2903 | 304.8 | 90.5 |
| 1/4[a] | 9.75 | 1030[b] | ~0 | ~100 | 3589[c] | 685 | 84.0 |

*A/O = the ratio of aqueous and organic phases; (aq): aqueous phase; (org): organic phase; Es: extent of stripping the metals in one stage
[a]10% $NaHCO_3$ was used to strip chromium(VI).
[b]No copper(II) was observed in this solution.
[c]No chromium(VI) was observed in this solution.

EXAMPLE 12

In this example, extraction and separation of chromium (VI) and copper(II) were achieved with a three fiber set microporous hollow fiber membrane device. The batch process described above indeed removes chromium(VI) and copper(II) from water. However, since this process employs one extraction step and two separate stripping steps, the synergy of the system can be improved with the three set microporous hollow fiber membrane apparatus, e.g., as shown schematically in FIG. 9. Preliminary experiments demonstrate that this device can remove and separate chromium(VI) and copper(II) simultaneously from synthetic waste water, as shown in Table 5.

TABLE 5

Extraction and separation of $Cr^{6+}$ and $Cu^{2+}$
using a three fiber set HFM device[a]

| Feed[b] flow rate (ml/min) | Feed pH | $pH_{out}$ | 0.1M NaOH flow rate (ml/min) | $Cr^{6+}$ in NaOH (ppm) | 2M $H_2SO_4$ flow rate (ml/min) | $Cu^{2+}$ in $H_2SO_4$ ppm |
|---|---|---|---|---|---|---|
| 1.43 | 4.19 | 3.47 | 0.36 | 150.0 | 0.10 | 228 |

[a]Extractant solvent: 0.39M LIX 84 and 0.39M TOA in kerosene.
[b]The concentration of chromium(VI) was 220 ppm, and the concentration of copper(II) was 1000 ppm in the feed solution.

FIG. 19 schematically represents an embodiment of the present invention which comprises a synergistic membrane-based extactor apparatus for the removal and separation of anions and cations from an aqueous feed solution.

The application of hollow fiber membrane-based synergistic extraction and separation of metals in accordance with the teaching of this invention is not limited to the systems enumerated in the above examples. It may be applied as will be apparent to those skilled in the art to other solvent extraction and separation systems, for example, the extraction and separation of bioproducts from the fermentation broths, the extraction and separation of organic acids, the extraction and separation of other metals, etc. as well.

Such separations may be carried out using hydrophilic microporous/porous hollow fibers as well as long as they have adequate chemical resistance. The phase in the pores of such fibers may be aqueous or organic as desired with the appropriate pressure conditions identified by Prasad and Sirkar in Chapter 41 of Membrane Handbook edited by Ho and Sirkar (1992). Similarly, asymmetric microporous hollow fibers can be used (see Prasad and Sirkar, supra).

Various modifications apparent to those skilled in the art may be made without departing from the scope or spirit of the invention. Such modifications are within the scope of the appended claims.

Various reference have been cited throughout the specification, each of which is hereby incorporated herein by reference in its entirety. Specifically incorporated by reference are U.S. Pat. No. 4,789,468 to Sirkar, and U.S. Pat. No. 4,997,569 to Sirkar.

What is claimed is:

1. An ion transfer unit for synergistically facilitating the simultaneous extraction of at least two different ions, including first and second ions, from a feed solution, wherein said unit is capable of being used with a multi-ion extractant which is specific for at least both said first and second ions and with at least first and second auxiliary extractants, wherein the first auxiliary extractant is specific for at least the first ion and the second auxiliary extractant is specific for at least the second ion, said ion transfer unit comprising:

a fluid-tight housing having an interior shell surface defining an extractant chamber;

a feed solution member including at least one hollow fiber membrane disposed within said extractant chamber and connected to said housing, said hollow fiber membrane having an outer surface for contacting the multi-ion extractant and an inner surface for contacting the feed solution and defining a feed solution chamber, wherein said membrane is wettable by one of the feed solution and the multi-ion extractant thereby providing for formation of a stable interface in the pores of said membrane between the feed solution and the multi-ion extractant;

a pressure difference control means for maintaining a difference between a liquid pressure of the multi-ion extractant in said extractant chamber and a liquid pressure of the feed solution in said feed solution chamber within a predetermined pressure range so that said interface between the multi-ion extractant and the feed solution is substantially immobilized in the pores of said membrane of said feed solution member, thereby effectively preventing dispersion of the multi-ion extractant and the feed solution on opposing sides of said membrane;

at least two auxiliary extractant members, each auxiliary extractant member including at least one hollow fiber membrane disposed within said extractant chamber and connected to said housing, each said hollow fiber membrane having an outer surface for contacting the multi-ion extractant and an inner surface for contacting one of the auxiliary extractants and defining a respective auxiliary extractant chamber, wherein each said membrane is wettable by one of the multi-ion extractant and the respective auxiliary extractant disposed within its respective auxiliary extractant chamber in order to provide a stable interface in the pores of said membrane between the multi-ion extractant and the respective auxiliary extractant;

at least two auxiliary pressure difference control means, wherein each auxiliary pressure difference control means maintains a respective difference between the liquid pressure of the multi-ion extractant in said extractant chamber and a liquid pressure of the respective auxiliary extractant in its corresponding auxiliary extractant chamber substantially within a respective predetermined pressure range so that interfaces between the multi-ion extractant and the respective auxiliary extractant are substantially immobilized in the pores of said membrane of its respective auxiliary extractant member, to effectively prevent dispersion of the multi-ion extractant and respective auxiliary extractants on opposing sides of respective membranes;

wherein said unit is capable of simultaneously allowing ion transfer between the feed solution and the multi-ion extractant through said feed solution member, and between the multi-ion extractant and the auxiliary extractants through respective auxiliary extractant members;

whereby said ion transfer unit is capable of synergistically facilitating the extraction of at least said first and second ions from said feed solution chamber into said extractant chamber by allowing simultaneous selective removal of the ions from said extractant chamber into respective auxiliary extractant chambers by respective auxiliary extractants.

2. The ion transfer unit according to clam 1 wherein said extractant chamber further comprises an extractant solvent specific for anions and cations.

3. The ion transfer unit according to claim 2 wherein the extractant solvent comprises an organic diluent in which water has very low solubility and which has very low solubility in water.

4. The ion transfer unit according to claim 2 wherein the extractant solvent further comprises:

a liquid selected from the group consisting of xylene, heptane, kerosene, dodecane, decanol, octanol, vegetable oil, silicone oil, and mineral oil; and an agent selected from the group consisting of crown ether, a solvent ion exchanger, a chelating agent, an acidic extracting agent, and a basic extracting agent.

5. The ion transfer unit according to claim 1 further comprising:

a first stripping solution specific for a cation disposed in one of said auxiliary extractant chambers; and a second stripping solution specific for a proton disposed in another of said auxiliary extractant chambers.

6. The ion transfer unit according to claim 1 further comprising:

a first stripping solution specific for a cation disposed in one of said auxiliary extractant chambers; and a second stripping solution specific for an anion disposed in another of said auxiliary extractant chambers.

7. The ion transfer unit according to claim 1 further comprising:

a first stripping solution specific for a first ion disposed in one of said auxiliary extractant chambers; and a second stripping solution specific for a second ion disposed in another of said auxiliary extractant chambers;

wherein both the first and second stripping solutions are specific for an ion having the same charge.

8. The ion transfer unit according to claim 1 wherein each of said feed solution member and said auxiliary extractant members further comprise a hollow tube or plurality of intermingled hollow tubes.

9. The ion transfer unit according to claims 1 or 8 wherein each membrane is composed of a hydrophobic porous material selected from the group consisting of porous polyethylene, porous polypropylene, porous polymethylpentene, porous polyvinylidene fluoride, porous polyetheretherketone, porous polysulfone, porous polyethersulfone, and porous polytetrafluoroethylene.

10. The ion transfer unit according to claim 1 further comprising an extractant inlet port connected to a source of extractant, and an extractant outlet port connected to an overflow drain.

11. The ion transfer unit according to claim 1 wherein at least one ion is a cation selected from the group consisting of copper(II), zinc(II), iron(III), nickel(II), cobalt(II), magnesium(II), lithium(I), sodium(I), potassium(I), cesium (I), and aluminum(III), and at least one ion is an anion selected from the group consisting of chromium(VI), tungsten(VI), molybdenum(VI), cadmium(II), and mercury (II).

12. The ion transfer unit according to claim 1 wherein the feed solution further includes one or more vaporizable solutes, wherein said ion transfer unit further comprises a vacuum atmosphere member, fabricated from a nonporous material that is selectively permeable to at least one vaporizable solute, connected to said housing and located within said extractant chamber for contact with the extractant solvent and in proximity to said feed solution member, wherein said housing further comprises a vacuum outlet port which communicates with said vacuum atmosphere member, and wherein the extractant solvent further comprises a diluent which is a high boiling, inert organic liquid.

13. A method for synergistically and selectively removing at least two ionic solutes from a feed solution using an ion transfer system, a multi-ion extractant specific for the at least two ions and at least two ion-specific auxiliary extractants, wherein one of the auxiliary extractants is specific for one of the at least two ions and wherein another of the auxiliary extractants is specific for another of the at least two ions, the system including: a housing defining a shell-like extractant chamber for accommodating the extractant solvent; a feed solution HFM member disposed within the extractant chamber and comprised of a porous membrane which defines a feed solution chamber therein, the porous membrane being wettable by one of the feed solution and the multi-ion extractant; and at least two auxiliary extractant HFM members disposed within the extractant chamber, each comprised of a porous membrane which defines respective auxiliary extractant chambers, each porous membrane being wettable by the multi-ion extractant or by a respective auxiliary extractant; the method comprising the steps of:

introducing the multi-ion extractant into the extractant chamber and into simultaneous contact with the feed solution member and the auxiliary extractant members;

introducing the feed solution into the feed solution chamber;

introducing the auxiliary extractants into respective auxiliary extractant members;

maintaining a stable interface between the multi-ion extractant and the feed solution within the porous membrane of the feed solution member, thereby preventing dispersion of the multi-ion extractant and the feed solution on opposing sides of the membrane; and maintaining a stable interface between the multi-ion extractant and the respective auxiliary extractants within the porous membrane of each respective auxiliary extractant member, thereby preventing dispersion of the multi-ion extractant and the respective auxiliary extractants on opposing sides of each respective membrane;

whereby the at least two ions are simultaneously transferred from the feed solution to the multi-ion extractant while the at least two ions are simultaneously transferred from the multi-ion extractant to respective auxiliary extractants.

14. The method according to claim 13 wherein the multi-ion extractant enables simultaneous extraction of anions and cations from the feed solution.

15. The method according to claim 13 wherein the multi-ion extractant comprises an organic extractant solvent; and wherein one of the auxiliary extractants stripping solutions comprises a first aqueous stripping solution, whereby the organic extractant solvent forms a liquid membrane between the first aqueous stripping solution and the feed solution.

16. The method according to claim 15 wherein another of the auxiliary extractants comprises a second aqueous stripping solution, wherein the extractant solvent further simultaneously forms a liquid membrane between the second aqueous stripping solution and the feed solution.

17. The method according to claim 13 further comprising maintaining the pH of the feed solution to within a predetermined range.

18. The method according to claim 13 further comprising maintaining a substantially constant pH in the feed solution.

19. A method for selectively and synergistically removing at least two different ionic solutes from a feed solution with a multi-ion extractant, which is specific for both the at least two different ionic solutes, and at least two auxiliary extractants, wherein at least one of the auxiliary extractants is specific for one of the at least two ions and wherein at least one other of the auxiliary extractants is specific for another of the at least two ions, the method comprising:

providing a first stable interface between the feed solution and the multi-ion extractant at a first porous membrane;

providing a second stable interface between the multi-ion extractant and one of the auxiliary extractants at a second porous membrane; and providing a third stable interface between the multi-ion extractant and the other of the auxiliary extractants at a third porous membrane, wherein the multi-ion extractant simultaneously contacts the first, second and third stable interfaces;

whereby the at least two ions are simultaneously transferred from the feed solution to the multi-ion extractant, while each of the at least two ions are also simultaneously transferred from the multi-ion extractant to respective auxiliary extractants.

* * * * *